(12) United States Patent
Gärtner et al.

(10) Patent No.: US 7,159,831 B2
(45) Date of Patent: Jan. 9, 2007

(54) ADJUSTING DEVICE

(75) Inventors: Hartmut Gärtner, Oberkochen (DE); Gerhard Gaida, Aalen (DE); Franz Krug, Aalen (DE); Daniel Kolster, Oberkochen (DE); Alexander Enns, Schwäbisch Gmünd (DE)

(73) Assignee: Carl-Zeiss-Stiftung, Heidenheim (DE)

( * ) Notice: Subject to any disclaimer, the term of this patent is extended or adjusted under 35 U.S.C. 154(b) by 188 days.

(21) Appl. No.: 10/782,970

(22) Filed: Feb. 23, 2004

(65) Prior Publication Data

US 2004/0164214 A1 Aug. 26, 2004

(30) Foreign Application Priority Data

Feb. 21, 2003 (DE) ................. 103 07 448
Jul. 7, 2003 (DE) ................. 103 30 581

(51) Int. Cl.
*E04G 3/00* (2006.01)
*G02B 21/00* (2006.01)

(52) U.S. Cl. ............... 248/274.1; 248/287.1; 248/292.12; 359/375; 359/384; 74/415; 74/465

(58) Field of Classification Search ............ 248/276.1, 248/919, 278.1, 125.1, 298.1, 287.1, 207, 248/291.1, 292.12, 280.11, 125.2, 281.11, 248/123.11, 274.1, 279.1, 123.1, 676; 359/368, 359/385, 384, 363, 375, 382; 74/415, 465
See application file for complete search history.

(56) References Cited

U.S. PATENT DOCUMENTS 2,376,384 A * 5/1945 Ringle et al. ................. 433/50
2,967,458 A * 1/1961 Stone, Jr. .................... 359/375
3,581,666 A * 6/1971 Bertin ........................ 104/23.2
3,868,171 A * 2/1975 Hoppl ........................ 359/384
4,714,328 A 12/1987 Takahashi
4,789,920 A * 12/1988 Helbig et al. ................ 362/519
6,159,125 A * 12/2000 Miller ........................ 475/196
6,254,046 B1 * 7/2001 Biber ........................ 248/287.1
6,296,217 B1 * 10/2001 Ikedo et al. ........... 248/292.12
6,402,111 B1 * 6/2002 Stewart et al. .............. 248/317
6,427,959 B1 * 8/2002 Kalis et al. ............. 248/288.11
2004/0164214 A1* 8/2004 Gartner et al. .......... 248/287.1
2006/0022103 A1* 2/2006 Boulard ................... 248/298.1

FOREIGN PATENT DOCUMENTS

EP 1 222 986 7/2002

* cited by examiner

*Primary Examiner*—Carl D. Friedman
*Assistant Examiner*—Tan Le
(74) *Attorney, Agent, or Firm*—Walter Ottesen

(57) ABSTRACT

An adjusting device (3) is suitable especially for use on a stand (1) for a surgical microscope (2). The adjusting device (3) makes it possible to move the surgical microscope (2) in a plane (9) perpendicular to the optical axis (8) of the surgical microscope (2). For this purpose, a transmission is provided in the adjusting device (3) which includes a coupling plate which is operatively connected to two force-transmitting elements. When this transmission is moved, at least one of the force-transmitting elements rolls off on the coupling plate. Alternatively, this transmission can be built up as a four-point linkage chain or contain a rhombic mechanism or lever mechanism. It is also possible to configure the transmission with belt elements or to configure the same as an eccentric arrangement having two offset rotation centers.

14 Claims, 27 Drawing Sheets

ADJUSTING DEVICE

CROSS REFERENCE TO RELATED APPLICATIONS

This application claims priority of German patent application nos. 103 07 448.1 and 103 30 581.5, filed Feb. 21, 2003 and Jul. 7, 2003, respectively, the entire contents of which are incorporated herein by reference.

FIELD OF THE INVENTION

The invention relates to an adjusting device having a base unit and a load take-up unit which are coupled via a transmission. The transmission makes possible a movement of the load take-up unit relative to the base unit in two different directions.

BACKGROUND OF THE INVENTION

An adjusting device of this kind is disclosed in U.S. Pat. No. 6,254,046. Here, an adjusting device is described for connecting to a stand for a surgical microscope. With the adjusting device, a surgical microscope, which is accommodated on the stand, can be moved in a horizontal plane. This adjusting device has a base unit which is connected to a carrier arm of the stand. A housing is connected to this base unit wherein a slide disc is journalled and this slide disc functions as a load take-up unit. The slide disc holds a surgical microscope, which is accommodated on the stand, and this slide disc can be moved in a horizontal plane by means of two spindle drives.

U.S. Pat. No. 4,714,328 discloses a surgical microscope having an adjusting device which makes possible a movement of the surgical microscope, which is accommodated on the stand, in a horizontal direction. The adjusting device has a base unit which is carried by a stand arm and is coupled to a load take-up unit via a cross-slide guide. This load take-up unit carries the surgical microscope. Spindle drives are provided for driving the cross-slide guide.

European patent publication 1,222,986 discloses a machine tool which includes a machine table which can be shifted along two axes of movement orthogonal to each other. A toothed rack is provided as a longitudinal drive for the movement of this machine table in a horizontal plane. The toothed rack mechanism is combined with a spindle mechanism functioning as a transverse drive.

SUMMARY OF THE INVENTION

It is an object of the invention to provide a simple and compactly configured adjusting device which makes possible an exact movement of a taken-up load in a plane.

The adjusting device of the invention includes: a base unit; a load take-up unit; a transmission coupling the units to each other so as to permit a movement of the load take-up unit relative to the base unit in two different directions; the transmission including: a coupling plate; two force-transmitting units operatively connected to the coupling plate; and, means for operatively connecting the load take-up unit to the two force-transmitting units so as to cause at least one of the force-transmitting units to roll off on the coupling plate in response to a movement of the load take-up unit relative to the base unit.

A transmission is provided in such an adjusting device which couples a base unit to a load take-up unit in such a manner that a movement of the load take-up unit relative to the base unit is preferably possible in two different directions. The transmission has a coupling plate which is operatively connected to two force-transmitting elements. At least one of the force-transmitting elements rolls off on the coupling plate when there is a movement of the load take-up unit relative to the base unit. In this way, an XY-adjusting device is provided which is suitable especially for the movement of machine tables in machine tools.

According to another feature of the invention, the force-transmitting elements are configured as endless track units or belt units rolling off on the coupling plate. In this way, an adjusting device is provided with which especially large forces can be transmitted.

In another embodiment of the invention, the force-transmitting elements include two wheel elements journalled on rotation shafts. In this way, an adjusting device is provided which can be moved by slight forces.

According to another feature of the invention, the directions of the rotational shafts of the wheel elements are orthogonal to each other. In this way, an easy running of the adjusting device is ensured.

According to another feature of the invention, an additional coupling plate is provided which is operatively connected to the force-transmitting elements. In this way, a transmission mechanism is provided which causes the additional coupling plate to move relative to the first coupling plate by twice the periphery of the force-transmitting element for a simple revolution of the force-transmitting element.

According to another feature of the invention, a coupling plate configured as a toothed plate is provided. In this embodiment of the invention, wheel elements, which are configured as toothed wheels or gear wheels, are provided. In this way, a low friction adjusting device is provided with which high forces can be transmitted.

In another feature of the invention, a drive is assigned to the wheel elements. In this way, a wanted position of the load take-up unit to the base unit can be precisely adjusted.

According to another feature of the invention, the drive is configured as an electric drive. In this way, an easily controllable adjustable device is provided.

According to another feature of the invention, at least one coupling plate has a cutout for passing through cables. In this way, an adjusting device is provided through which supply harnesses for an apparatus, which is taken up by the adjusting device, can be passed.

According to another feature of the invention, a coupling plate is fixedly connected to the base unit. In this way, the coupling plate reinforces the mechanical stiffness of the base unit so that an adjusting device is provided which can be loaded with high forces.

In another embodiment of the invention, a coupling plate is fixedly connected to the load take-up unit. In this way, the loadability of the load take-up unit can be increased.

In a further embodiment of the invention, the wheel elements are journalled in a support unit fixedly connected to the base unit. In this way, the weight of component assemblies, which are transversely displaced in the adjusting device, can be reduced.

The transmission of the adjusting device can also include a first four-joint chain which is journalled on a first holding part via a first rotational joint and a second rotational joint and is operatively connected to the base unit via a third rotational joint. In such a transmission, a second four-joint chain is provided which is journalled on a second holding part via a first rotational joint and a second rotational joint and is operatively connected via a third rotational joint to a load take-up unit. The first four-joint chain is fixedly connected to the second four-joint chain. Such an adjusting device makes possible a low weight and permits a thin configuration for a comparatively small diameter.

In a further embodiment, in one such adjusting device, a drive is provided for moving a four-joint chain. In this way, a precise movement of the adjusting device is made possible.

Preferably, the drive is configured as a spindle drive with an electric motor. In this way, large drive forces can be generated with the adjusting device.

A connecting region to a stand for a surgical microscope can be provided in that a holding arm is mounted on the base unit.

In a further embodiment of such an adjusting device, a connecting arm is arranged on the load take-up unit. In this way, a connecting region is provided for a surgical microscope.

In a further embodiment of such an adjusting device, the first holding part is configured as a cover part and, preferably, the second part is correspondingly configured as a base part. In this way, a compact configuration of the adjusting device is made possible.

In another embodiment of such an adjusting device, the base unit is guided on the cover part with a slide bearing. In this way, friction forces in the adjusting device are minimized.

In another embodiment of the adjusting device, the cover part includes a cutout for the holding arm. In this way, a long displacement path of the adjusting device is made possible.

In another embodiment of the adjusting device, the load take-up unit is guided with a slide bearing on the base part. This also contributes to reducing friction forces in the adjusting device.

In another embodiment of the adjusting device, the base part includes a cutout for the connecting arm in order to make possible a long displacement path for a surgical microscope connected thereto.

In the adjusting device, a transmission having a lever element can also be provided which is journalled with a joint to a holding part and is operatively connected to the corresponding base unit and the load take-up unit. Preferably, this joint is configured as a ball joint. Such an adjusting device makes possible a comparatively long displacement path.

A drive can be provided for moving the adjusting device in order to so make possible precise travel paths. Preferably, the adjusting device has two spindle drives with electric motors. In this way, high forces can be made available with the adjusting device.

Preferably, the operative connection of lever element and base unit is configured as a ball joint and also the operative connection of the lever element and the load take-up unit is provided as a ball joint. Such an adjusting device is suitable for taking up large forces.

In another embodiment of such an adjusting device, the base unit is guided by a slide bearing on the cover part and, preferably, a corresponding slide bearing is also provided on a base part of the housing. In this way, friction forces can be minimized in the adjusting device.

Preferably, a cutout is provided in the cover part for the movement of a holding arm and the corresponding base part has a cutout for the movement of a connecting arm. In this way, long travel paths for the adjusting device are made possible.

The adjusting device can also contain a transmission with at least one belt element. The belt element couples a movement of the base unit with a movement of the load take-up unit. In this way, an adjusting device can be provided with comparatively low bearing play.

Preferably, the transmission of such an adjusting device includes a first belt element pair and a second belt element pair. The first and the second belt element pairs are guided as orthogonally as possible with respect to each other.

Slide bearings are provided on the base unit and on the holding unit in order to minimize friction forces.

In another embodiment, one such adjusting device has a drive which includes a first electric motor having a first spindle drive and a second electric motor having a second spindle drive. The first spindle drive and the second spindle drive are preferably journalled on the first holding unit. In order to move the base unit, the drive has a first guide element which is threadably connected to a nut, which is guided on the first spindle drive, and to the base unit. A stable movement transfer to the base unit is made possible in that the drive also has a second guide element which is likewise guided with a nut on the first spindle drive and is also linked to the base unit.

Preferably, a third guide element is also provided in the drive in such an adjusting device and this third guide element is linked to a third nut, which is guided on the second spindle drive, and to the base unit. The first guide element and the third guide element are parallel to each other.

Preferably, in the adjusting device, the belt element is guided with a slide bushing on a guide shaft fixedly connected to the base unit. This belt element is also supported with a slide bushing on a guide shaft fixedly connected to the load take-up unit. In this way, friction forces can be minimized in the adjusting device.

In one such adjusting device, direction-changing rollers are additionally provided over which the belt element is guided. These direction-changing rollers are accommodated in bearings which are fixed relative to the first holding unit. These direction-changing rollers can also be attached to the second holding unit.

The adjusting device is suitable for building into a surgical microscope in that a holding arm is configured on the base unit and a connecting arm is configured on the load take-up unit. To ensure long displacement paths, the first holding unit has a recess for a holding arm and the second holding unit has a recess for a connecting arm.

It is also possible to provide a joint-connected parallelogram as a transmission in the frame arrangement. This joint-connected parallelogram includes a first guide element, a second guide element, a third guide element and a fourth guide element. The joint-connected parallelogram is supported on the base unit with a first joint and is supported on the load take-up unit with a second joint. Preferably, the first joint and the second joint are configured as ball joints. In this way, an adjusting device with especially low inherent weight is provided.

In that a drive is provided in such an adjusting device, the adjusting device can be precisely moved. Preferably, a drive of this kind has three spindle drives with electric motors. To facilitate the installation in a stand for a surgical microscope, a holding arm is arranged on the base unit and a connecting arm is disposed on the load take-up unit.

Such an adjusting device has, in turn, slide bearings in order to make possible a low friction displacement. Long displacement paths can be achieved in that cutouts for a holding arm and connecting arm are provided in the base part and cover part of a housing.

It is also possible to couple in the adjusting device the base unit to the load take-up unit via a first rotational member and a second rotational member. The first rotational member is accommodated on the base unit rotatable about a rotational axis and the second rotational member lies on the first rotational member and can be rotated about a second rotational axis and, at the same time, the load take-up unit is fixed to the second rotational member and rotatable about a third rotational axis. The first rotational axis and the second rotational axis as well as the second rotational axis and the third rotational axis are offset to each other. The first rotational member and the second rotational member are configured as cylinders, preferably, as inclined cylinders.

An electric motor can be provided to drive at least one rotational member. A high stability of the adjusting device is achieved in that the rotational members have a honeycomb-shaped profile.

It is further possible to configure the transmission of the adjusting device with a first linkage arm and a second linkage arm which are connected to the load take-up unit so as to be rotationally moveable. At least one linkage arm is hinge connected by a rotational joint to a slider unit with which one connecting point of this joint arm can be displaced on the base unit in order to move the load take-up unit relative to the base unit.

Preferably, this slider unit is configured as a linear guide and includes a drive spindle. This drive spindle can be driven by an electric motor.

In a further embodiment of such an adjusting device, a coupling mechanism is assigned to the particular linkage arm and this coupling mechanism transmits a rotational movement of the rotational joint at the slider unit to the load take-up unit. This coupling mechanism can include a toothed belt. A housing is provided to cover the transmission and this housing is fixedly connected to the base unit. The load take-up unit is supported in this housing. Preferably, the displacement unit is also fixedly connected to the housing.

It is also possible to provide an eccentric transmission as a transmission in the adjusting device. This transmission has a first rotational center and a second rotational center which is offset to the first rotational center. The load take-up unit is moveable relative to the base unit about the first rotational center as well as also about the second rotational center.

Preferably, the first rotational center is defined by the shaft of a first spur gear which is fixedly connected to the base unit and the second rotational center is defined by the shaft of a second spur gear which is connected to means for holding the load take-up unit.

Preferably, a transmission intermediate member is also provided on which a first gear wheel is supported which meshes with the first spur gear and on which a second gear wheel is supported which meshes with the second spur gear.

An electric motor is, in turn, provided for driving the first gear wheel and the second gear wheel.

The load take-up unit is rotatably supported on the means for holding the load take-up unit. In that a further transmission is provided there as a coupling transmission, which transmits a rotation of the transmission intermediate member about the second rotational center to the load take-up unit, a constant orientation of a load taken up on the load take-up unit can be ensured when the adjusting device is moved.

In a further embodiment of such an adjusting device, this coupling transmission includes a toothed belt. In this way, a simply configured coupling transmission is provided. However, it is also possible to provide an electric motor with an assigned control unit in the additional transmission in order to make possible a constant orientation of a load taken up on the load take-up unit.

In a further embodiment of such an adjusting device, the axes of the first rotational center and of the second rotational center are parallel to each other. Preferably, a passthrough of cables or supply harnesses is provided in the adjusting device.

A stand having a carrier arm to accommodate a load on which the adjusting device according to the invention is provided makes possible a precise movement of the load in a horizontal plane. If, for example, a surgical microscope is accommodated on such a stand, a user can adjust the precise position of the viewing field or can move the center of gravity of the surgical microscope into a desired position.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
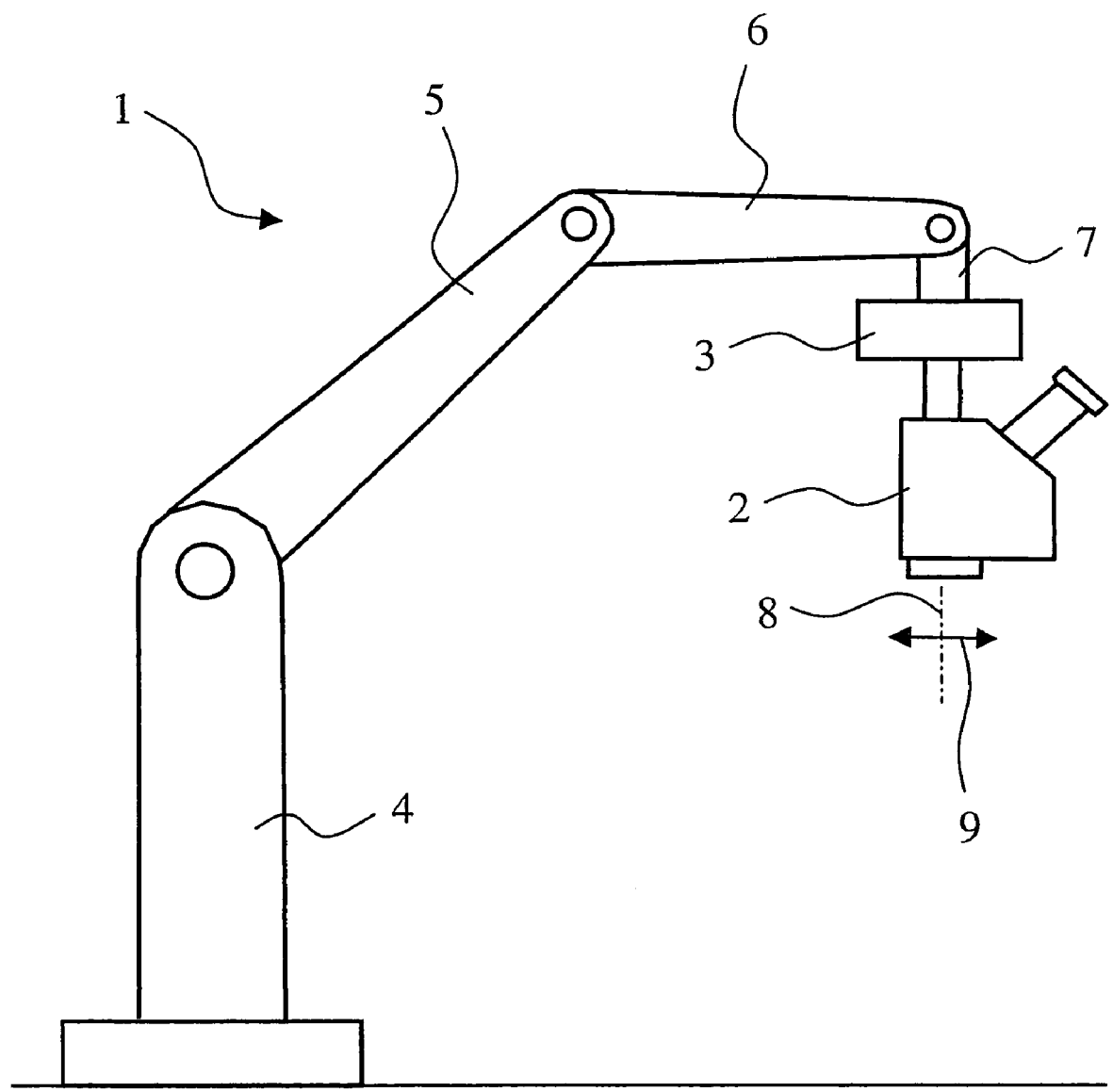
FIG. 1 shows a stand having an adjusting device of the invention on which a surgical microscope is accommodated.

FIG. 1 shows a stand 1 on which a surgical microscope 2 is accommodated by an adjusting device 3. The stand 1 has a rotatably journalled stand base 4 with joint-connected support arms 5 and 6 which make possible to position the surgical microscope 2 with the adjusting device 3 at a desired location in the room. The adjusting device 3 is carried by the stand 1 with a holding arm 7. The adjusting device 3 makes possible to transversely move the surgical microscope 2 in two mutually perpendicular directions in a plane 9 perpendicular to the optical axis 8 of the surgical microscope 2.

Figure 2:
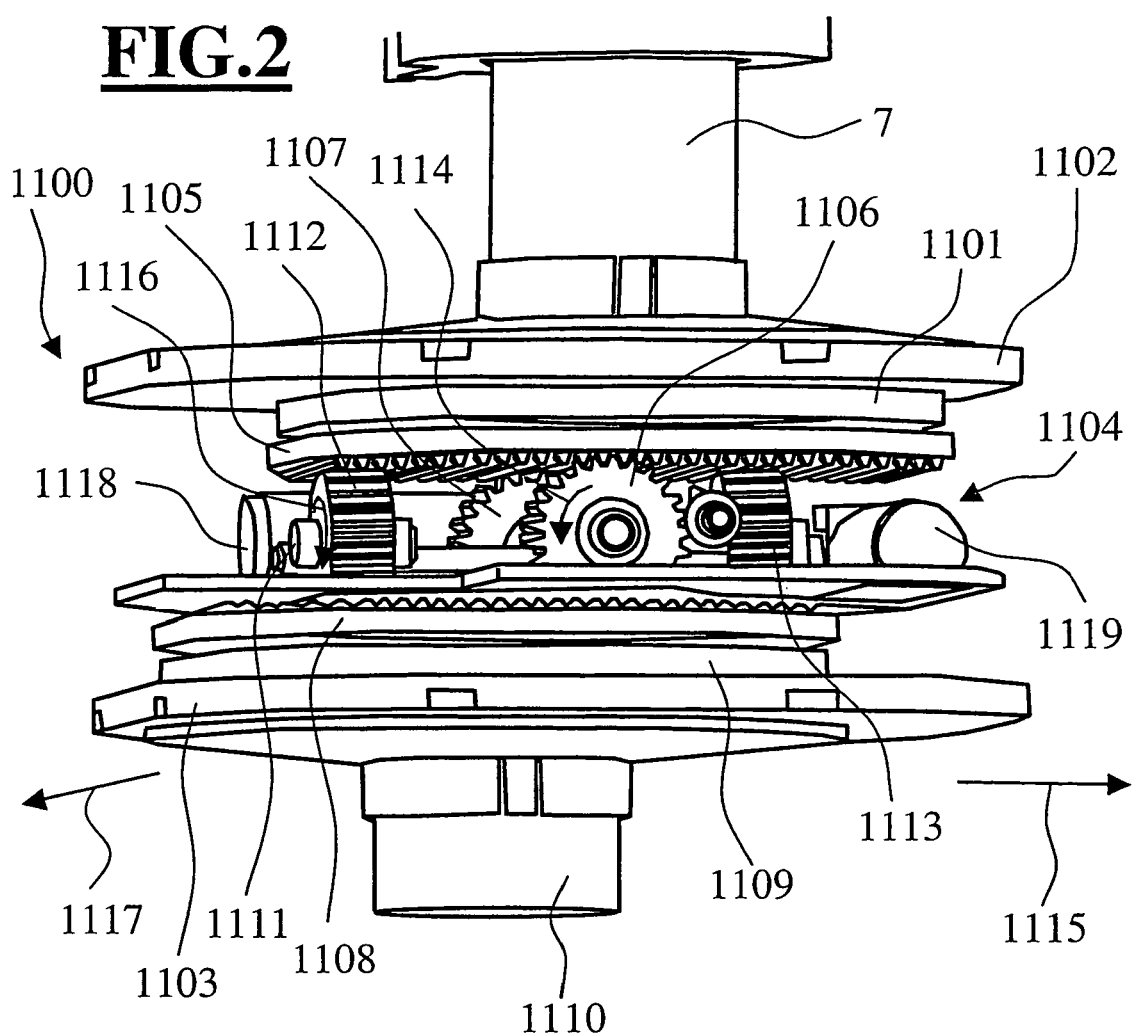
FIG. 2 is a perspective view of a first embodiment of an adjusting device of FIG. 1 with the housing removed.
Figure 4:
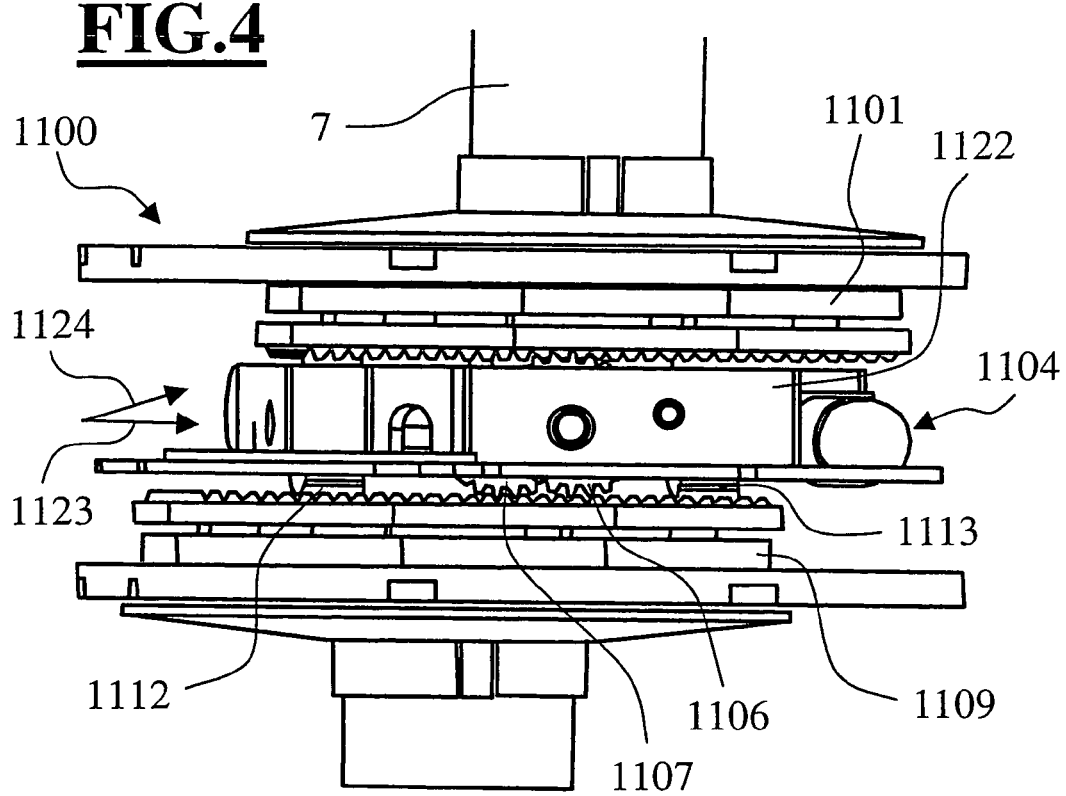
FIG. 4 is a further perspective view of the adjusting device with the housing removed.
Figure 5:
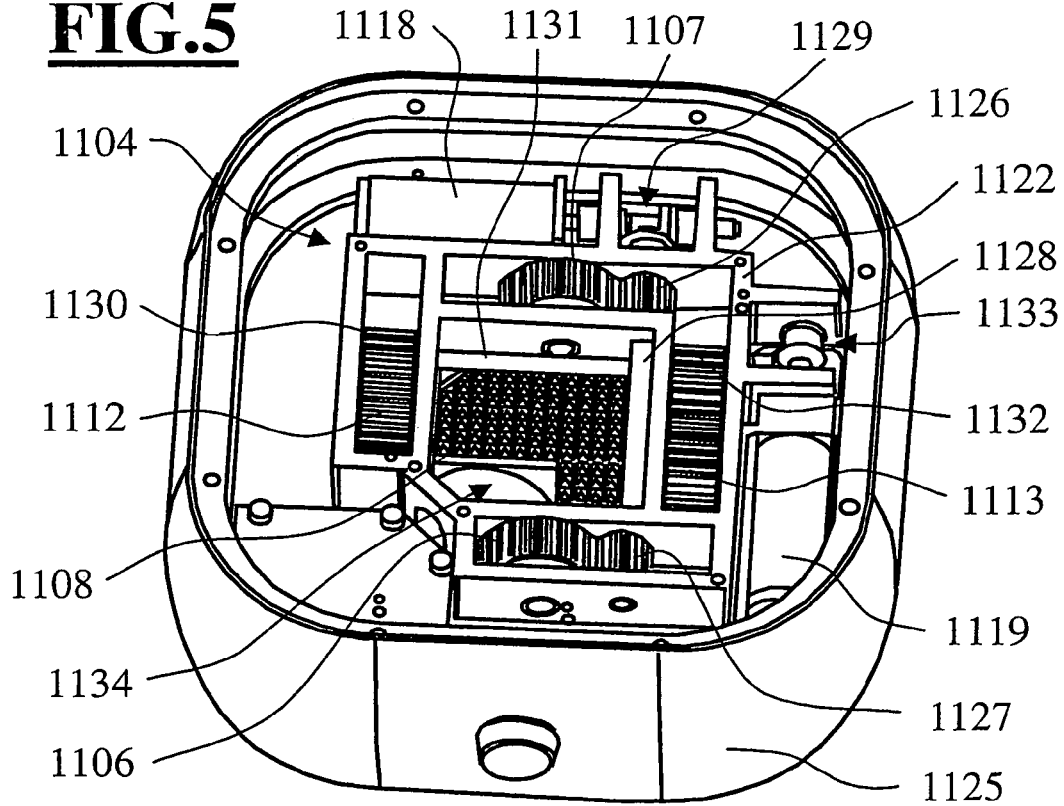
FIG. 5 is a view of the housing and transmission of the adjusting device.

The principal operation of a first embodiment for an adjusting device 3 is explained in detail with respect to FIGS. 2 and 5. Insofar as FIGS. 2 to 5 show the same assemblies, they are identified by the same reference numerals.

FIG. 2 shows a view of the assembly of the adjusting device 3 of FIG. 1 with the housing removed. The adjusting device 1100 has a base unit 1101, which is connected to the holding arm 7 of the stand 1 of FIG. 1. A cover 1102 of a housing is guided on the base unit 1101 by a slide bearing. The side walls of the housing are not shown in FIG. 2. This housing is closed off by the base part 1103.

The adjusting device 1100 further includes a transmission assembly 1104. This transmission assembly 1104 is carried by a support frame (not shown in FIG. 2) which is fixed to the side wall (not shown) of the housing.

The base unit 1101 is fixedly connected to a first coupling plate in the form of a toothed plate 1105. The coupling plate is operatively connected to a first pair of wheel elements in the form of gear wheels (1106, 1107) which function as force-transmitting elements. These gear wheels (1106, 1107) mesh with the toothed plate 1105. The adjusting device further includes a toothed plate 1108 which likewise meshes with the gear wheels (1106, 1107). This toothed plate 1108 is fixedly connected to a load take-up unit 1109. A connecting arm 1110 is formed on the load take-up unit for accommodating a load. The load take-up unit 1110 is supported by a slide bearing on the base part 1103 of the housing.

A gear wheel 1112 is arranged on a shaft 1111 perpendicular to the rotational axes of gear wheels (1106, 1107) and a further gear wheel 1113 lies opposite gear wheel 1112. This gear wheel 1112 and the gear wheel 1113 also mesh with the toothed plates (1105, 1108) and operate as force-transfer elements.

The load take-up unit 1109 of the adjusting device 1100 is displaced in the direction of arrow 1115 when the gear wheels (1106, 1107) move corresponding to the rotational direction indicated by the arrow 1114.

In the same way, a movement of the gear wheel 1112 and the opposite-lying gear wheel 1113 in a rotational direction indicated by arrow 1116 leads to a displacement of the load take-up unit 1109 in the direction of the arrow 1117 out of the plane of the drawing.

For a movement of the gear wheels (1106, 1107), the teeth of the toothed plates (1105, 1108) move relative to the teeth of the gear wheel 1112 and of the teeth of the opposite-lying gear wheel 1113. In the same way, the toothed plates 1105 and 1108 move relative to the gear wheels 1106 and 1107 when gear wheel 1112 and the opposite-lying gear wheel 1113 rotate.

Electric motors 1118 and 1119 are provided for driving the gear wheels 1106, 1107, 1112 as well as gear wheel 1113.

Figure 3:
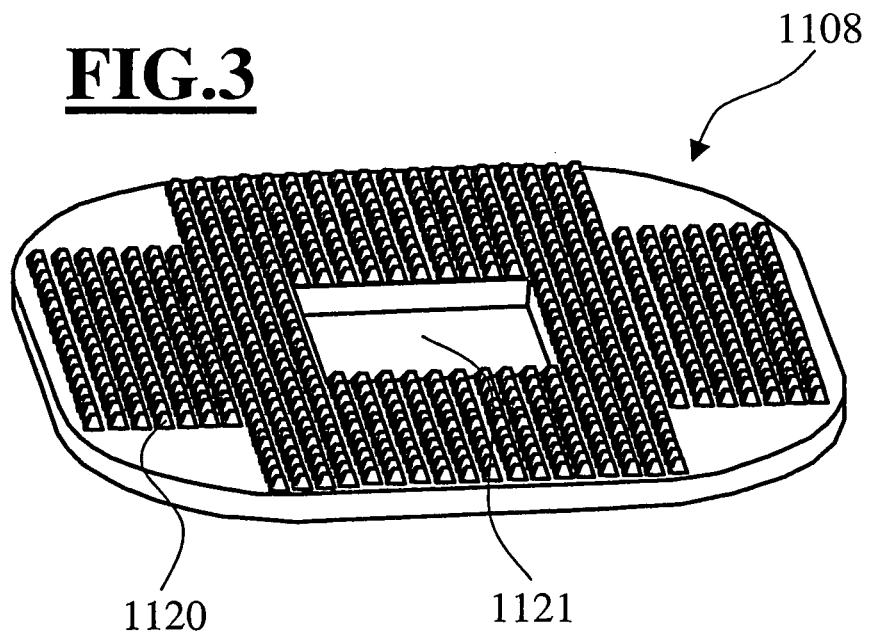
FIG. 3 is a perspective view of a toothed plate of the adjusting device functioning as a coupling plate.

FIG. 3 shows the toothed plate 1108 of FIG. 2. The toothed plate 1108 includes a plurality of teeth 1120, which are arranged in a cross pattern in a plane. The form of the teeth 1120 is matched to the form of the gear wheels 1106, 1107, 1112 and 1113 of FIG. 2. The toothed plate 1108 has a cutout 1121 through which electrical cables or supply harnesses for medical-optical equipment can be guided with the equipment being accommodated on the adjusting device.

In FIG. 4, the adjusting device 1100 is shown with the support frame 1122 for the transmission assembly 1104. The support frame 1122 is fixed in one of the side walls of the housing not shown in FIG. 4. The housing is formed by the side walls (not shown), the cover part 1102 and the base part 1103. For a drive of the gear wheels 1106 and 1112 by means of the electric motors 1118 and 1119, this housing is moved in the plane indicated by the arrows 1123 and 1124. The holding frame 1122 and the housing are moved relative to the base unit 1101 and, simultaneously, the load take-up unit 1109 is moved relative to the housing.

FIG. 5 shows a transmission assembly 1104 of the adjusting device 1100 shown in FIGS. 2 and 4. The transmission assembly 1104 is seated with the support frame 1122 in the side wall 1125 of the housing. The gear wheels 1106 and 1107 mesh with the toothed plate 1108 and are coupled for synchronism to gear wheels 1126 and 1127. The gear wheels 1126 and 1127 are connected via a rigid shaft 1128. The electric motor 1118 drives the gear wheel 1126 via a bevel-gear unit 1129. In a corresponding manner, the gear wheel 1112 is operatively connected to a gear wheel 1130 which, in turn, is coupled via a rigid shaft 1131 to a gear wheel 1132. The gear wheel 1132 meshes with gear wheel 1113 which lies opposite gear wheel 1112. In this way, there is also synchronism ensured of the gear wheels 1112 and 1113 which likewise mesh with toothed plate 1108. The electric motor 1119 functions as a drive for the gear wheels 1112 and 1113 and this motor is, in turn, coupled to the gear wheel 1132 in a corresponding manner via bevel-gear unit 1133.

The arrangement of the transmission assembly 1104 in the support frame 1122 ensures free space 1134 for the passthrough of electric cables, supply harnesses or even light conductors (not shown) through the adjusting device.

In the embodiment described, the adjusting device is configured with two toothed plates. However, it is also possible to provide only one toothed plate. Here, the toothed plate can be fixedly connected to the base unit and the transmission assembly with a load take-up unit connected thereto can be moved relative to this toothed plate. In the opposite manner, the transmission assembly can be fixedly connected to the base unit and, in a corresponding manner, the load take-up unit can be moved via a toothed plate fixedly connected thereto. Furthermore, it is also conceivable to combine several toothed plates having transmission assemblies with each other to a sandwich arrangement in order to obtain an adjusting device for long displacement paths based on transmissions operating with each other.

In the adjusting device described with respect to the FIGS. 2 to 5, it is also possible to configure the transmission group 1104, which is accommodated in the support frame 1122, as a multistage transmission, that is, a first gear wheel group meshes with a first toothed plate and this gear wheel assemblage then drives corresponding gear wheels which, in turn, mesh with a second toothed plate.

Figure 6:
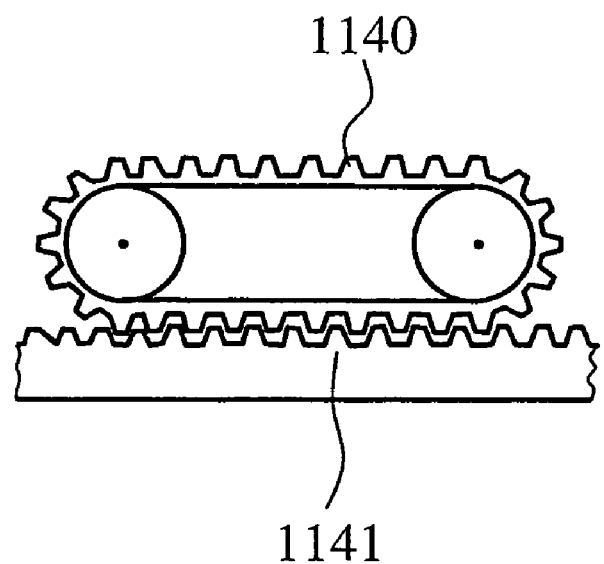
FIG. 6 shows a coupling plate with a track unit as a force-transmitting element in the adjusting device.

As shown in FIG. 6, endless track elements 1140 can be provided in the adjusting device in lieu of gear wheels. The endless track element 1140 can engage in teeth of a coupling plate 1141 and be operatively connected form-tight with the coupling plate 1141 in the same way as with a toothed wheel. Preferably, two endless track elements are orientated perpendicular to each other so that for a movement of the one endless track element, this one operates on the coupling plate while the other endless track unit glides along this coupling plate and vice versa. An adjusting device with endless track elements has only comparatively slight play.

Figure 7:
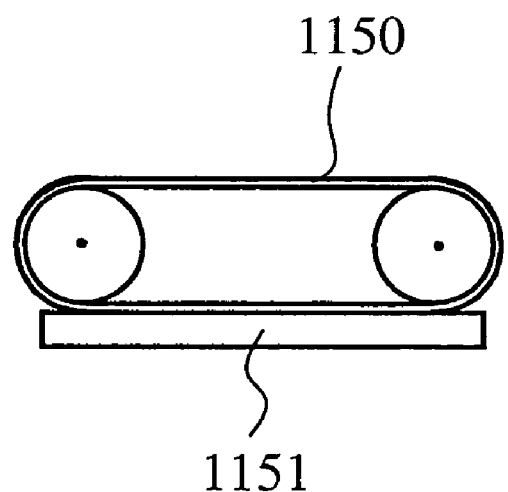
FIG. 7 shows a coupling plate with a belt unit as a force-transmitting element in the adjusting device.

FIG. 7 is a detailed view of a corresponding adjusting device wherein a belt unit 1150 is provided as a force-transmitting element which operates friction-tight on a coupling plate 1151.

Furthermore, it is also possible not to use gear wheels in the adjusting device described with respect to the FIGS. 2 to 5; rather, the gear wheels can be replaced by rollers and the toothed plates can be replaced by corresponding smooth discs. However, here, the surfaces of the rollers and the plates must be so matched to each other that a friction-tight force transmission is ensured.

Figure 8:
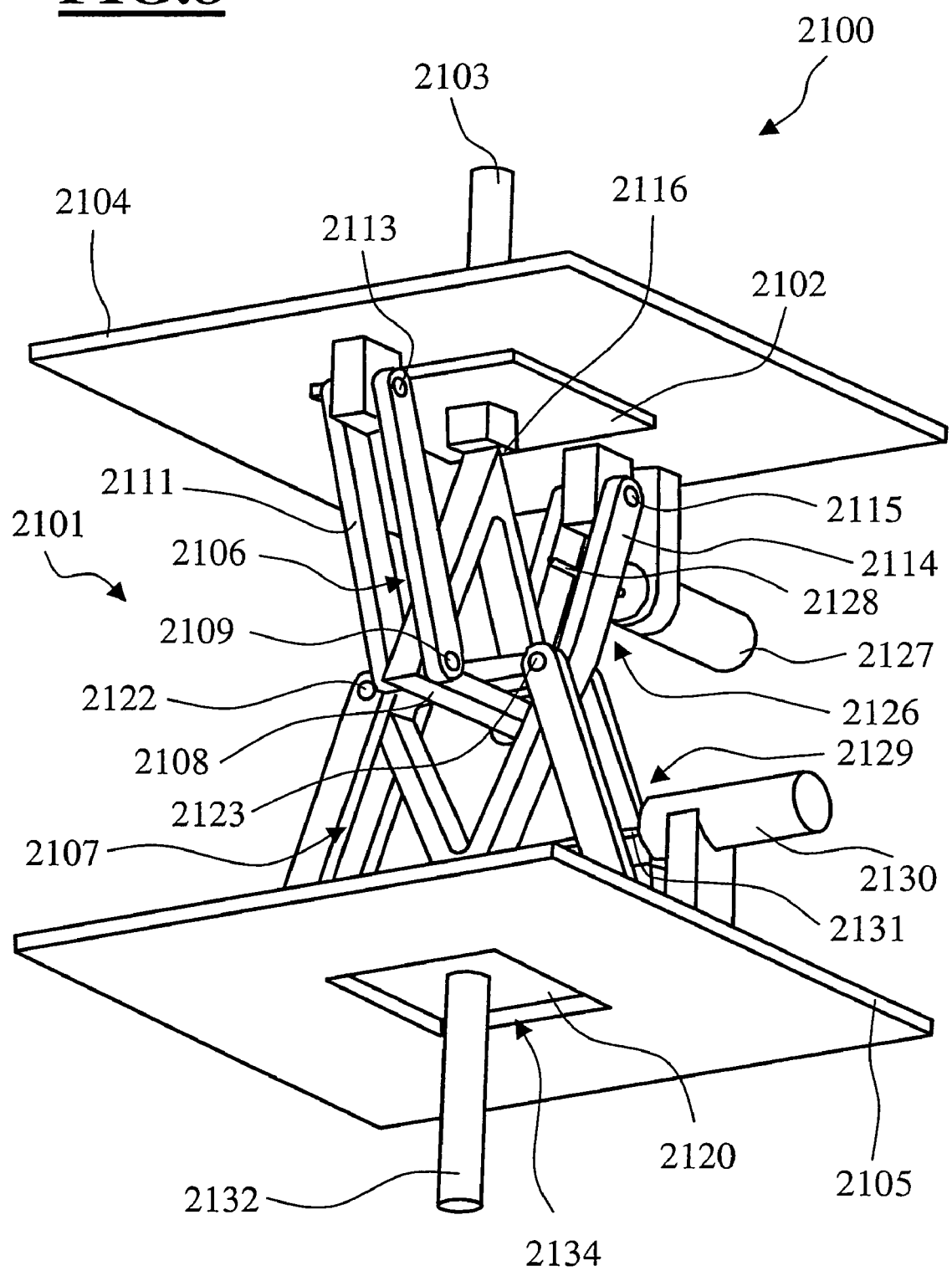
FIGS. 8 and 9 are perspective views of a second embodiment for the adjusting device of FIG. 1 with the housing removed.
Figure 9:
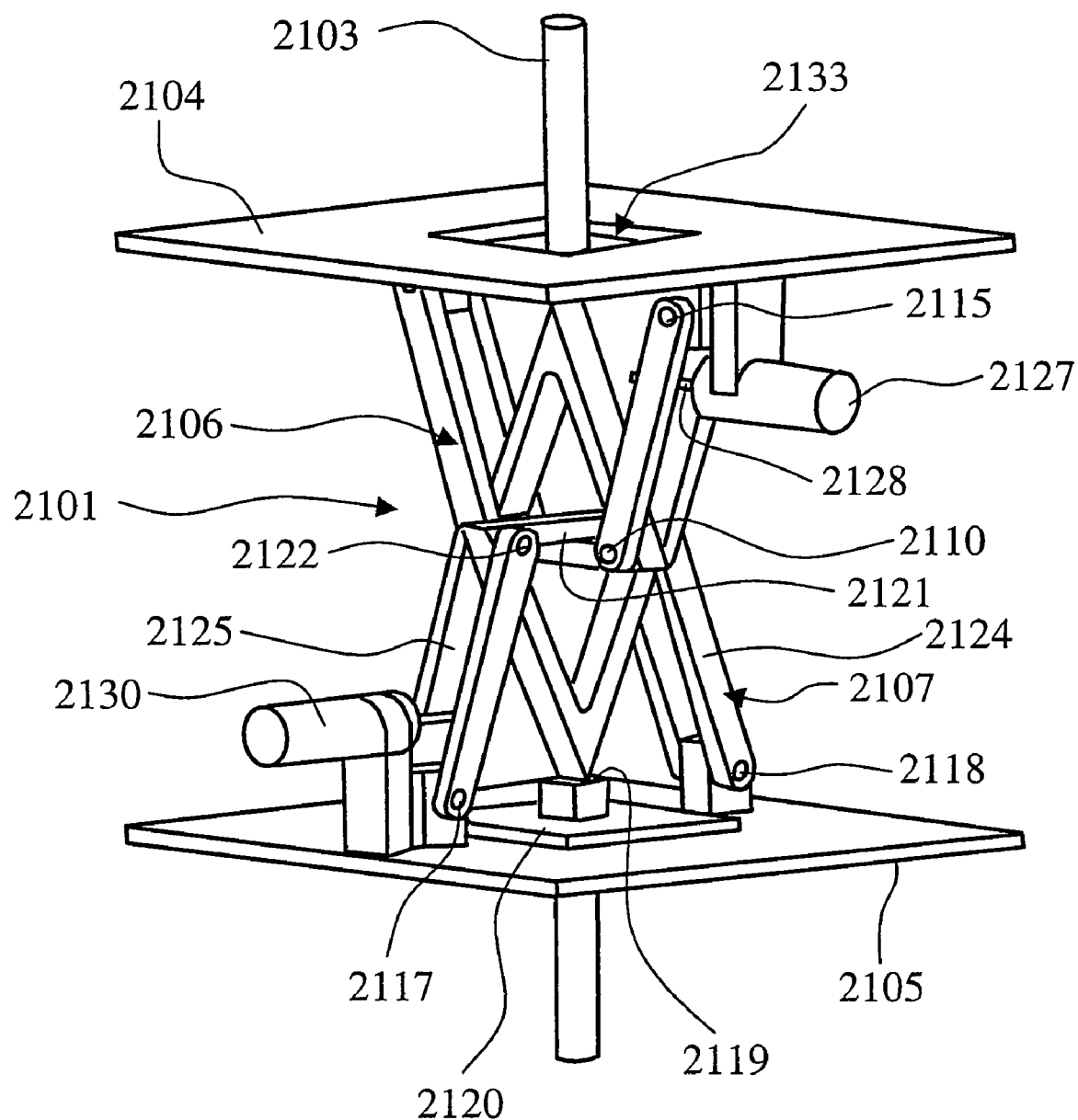

FIGS. 8 and 9 explain the operational principle of a second possible embodiment 2100 for an adjusting device 3 of FIG. 1. The adjusting device 2100 is shown without a housing which covers a transmission 2101 of the adjusting device 2100. Insofar as FIGS. 8 and 9 show identical assemblies of the adjusting device, they are identified by the same reference numerals.

The adjusting device 2100 has a base unit 2102 which is connected to a holding arm 2103 of the stand 1 of FIG. 1. A first holding part 2104 is guided on the base unit 2102 with a slide bearing. This holding part is fixedly connected to the housing (not shown) of the adjusting device 2100. This housing is closed off by a second holding part 2105 which functions as a base part. The transmission 2101 includes a first four-joint chain 2106 and a second four-joint chain 2107. The first four-joint chain 2106 has a triangular structure with an end member 2108 which is connected via rotational joints 2109 and 2110 to guide units 2111 and 2114.

The first four-joint chain 2106 is hinged to the first holding part 2104 via the first guide unit 2111 with a first rotational joint 2113 and via the second guide unit 2114 with a second rotational joint 2115. The triangular structure of the first four-joint chain 2106 is connected to the base unit 2102 via a third rotational joint 2116.

The second four-joint chain 2107 is hinged to the second holding part 2105 by a first rotational joint 2117 and a second rotational joint 2118. The second four-joint chain 2107 is connected to the load take-up unit 2120 via a third rotational joint 2119. The configuration of the second four-joint chain 2107 corresponds to that of the first four-joint chain 2106. The second four-joint chain includes likewise a triangular structure having an end member 2121 which is connected to the guide units 2124 and 2125 via rotational joints 2122 and 2123.

The first four-joint chain 2106 and the second four-joint chain 2107 are fixed with respect to each other on the end members 2108 and 2121.

A drive 2126 is assigned to the first four-joint chain 2106. This drive 2126 includes an electric motor 2127 which drives a spindle 2128. This spindle 2128 operates on a nut (not shown) which is connected to the first four-joint chain 2106. By rotating the spindle, the nut is translatorily moved in order to cause a pivot movement of the first four-joint chain 2106 about the rotational joints 2113 and 2115.

A drive 2129 is assigned to the second four-joint chain 2107. This drive likewise includes an electric motor 2130, which acts on a spindle 2131. Via a nut and by rotating the spindle 2131, the second four-joint chain 2107 can be deflected about the first rotational joint 2117 and the second rotational joint 2118 for a pivot movement.

The base unit 2102 is fixedly connected to the holding arm 2103. In the same way, a connecting arm 2132 is assigned to the load take-up unit 2120.

To make possible a traveling movement of the holding arm 2103 or connecting arm 2132 relative to the first holding part 2104 and to the second holding part 2105 with movements caused by the first and second four-joint chains driven by the electric motors 2127 and 2130, a cutout 2133 is provided in the first holding part 2104 and a cutout 2134 is disposed on the second holding part 2105.

Figure 10:
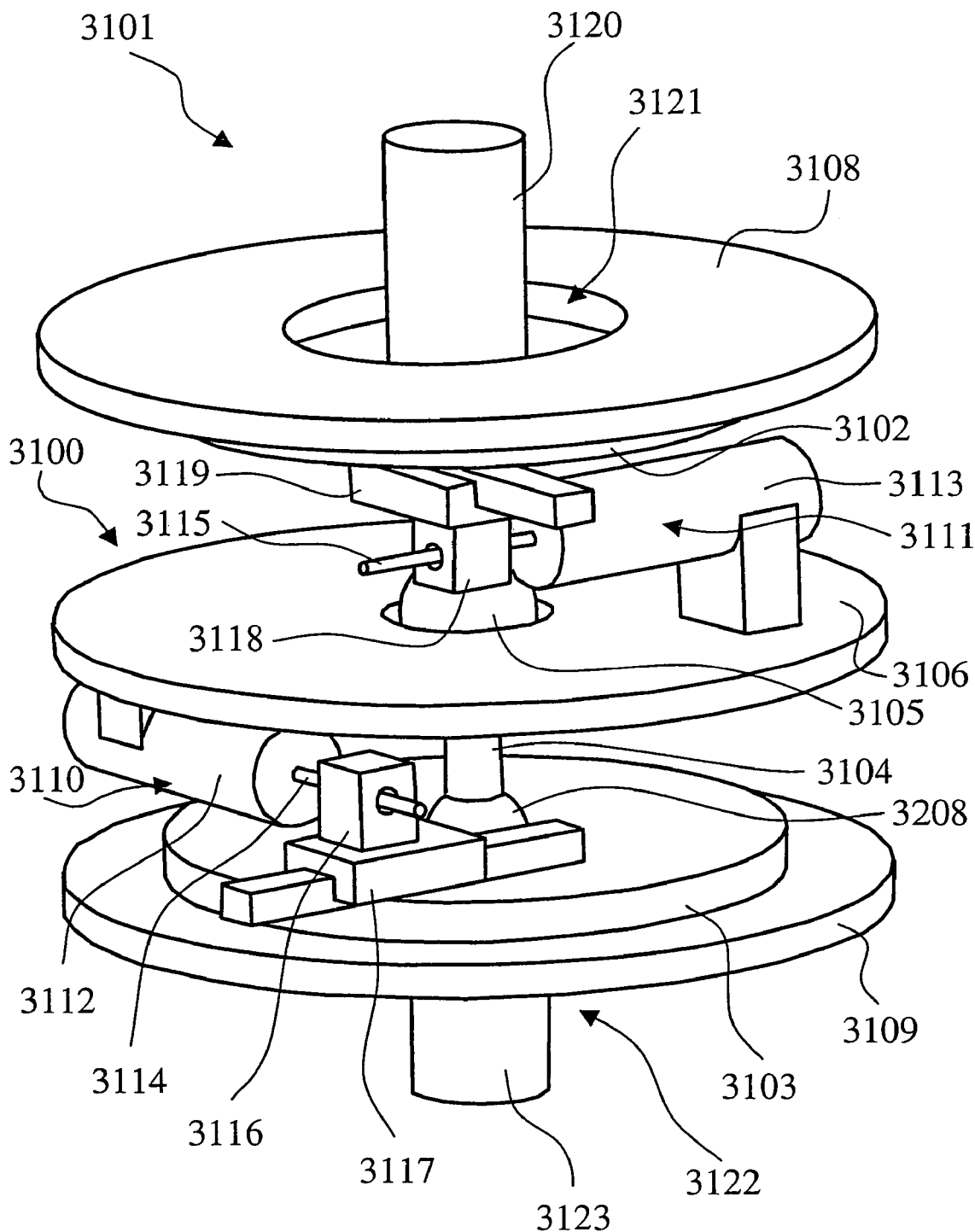
FIGS. 10 and 11 show perspective views of a third embodiment for the adjusting device of FIG. 1 with the housing removed.
Figure 11:
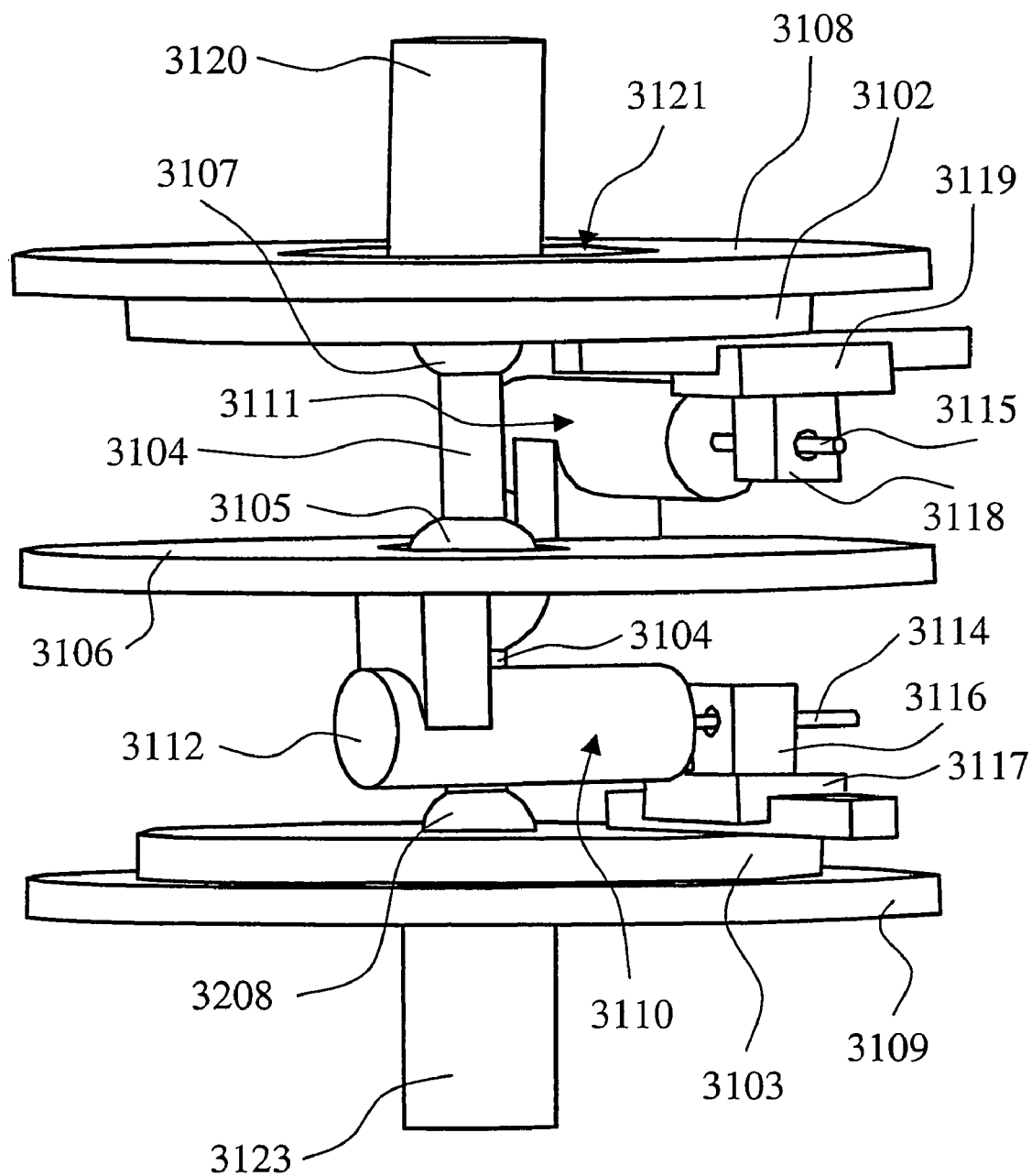
Figure 12:
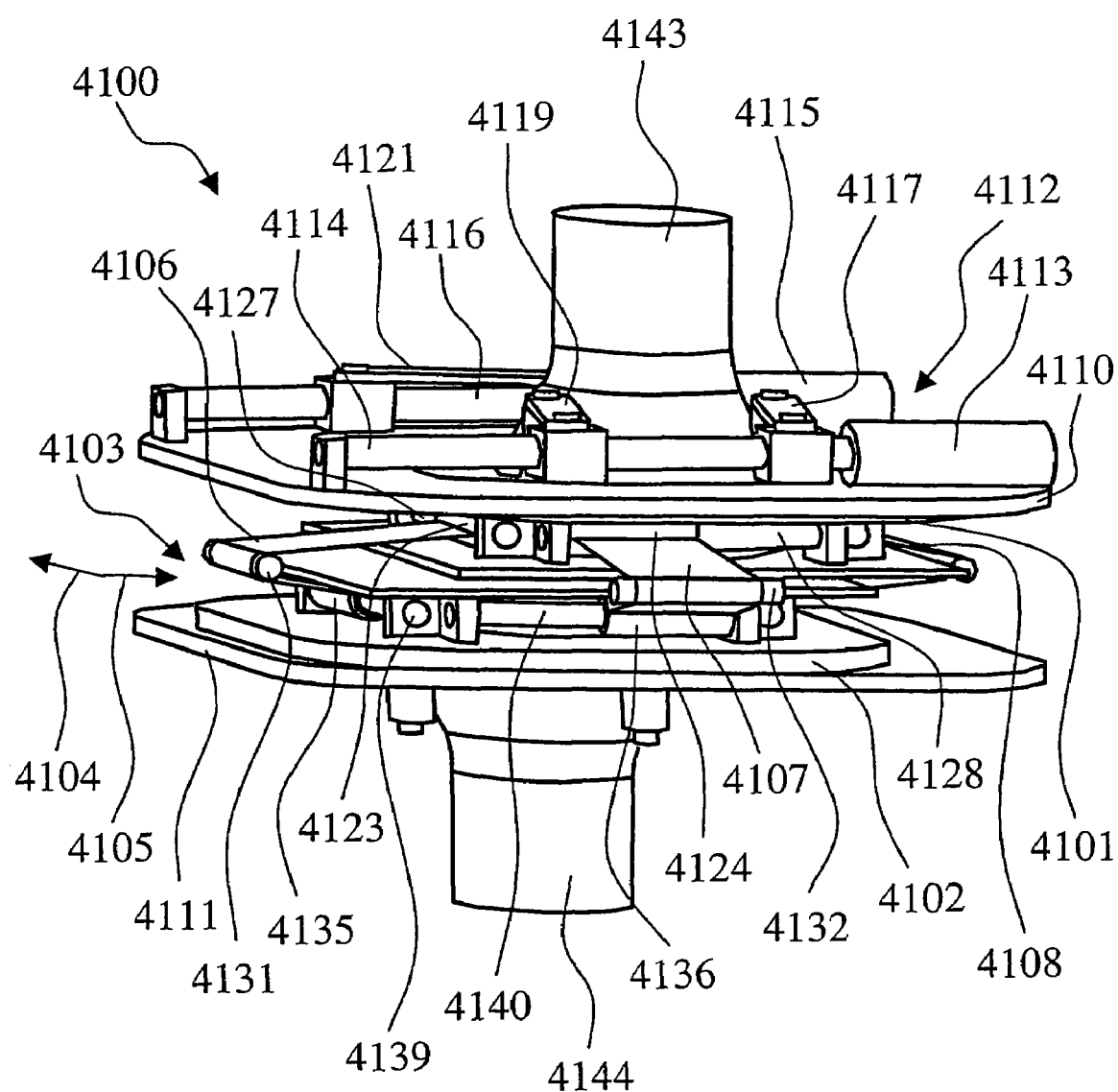
FIGS. 12 to 17 are schematics which explain the operation of a further embodiment for the adjusting device of FIG. 1 with the housing removed.
Figure 13:
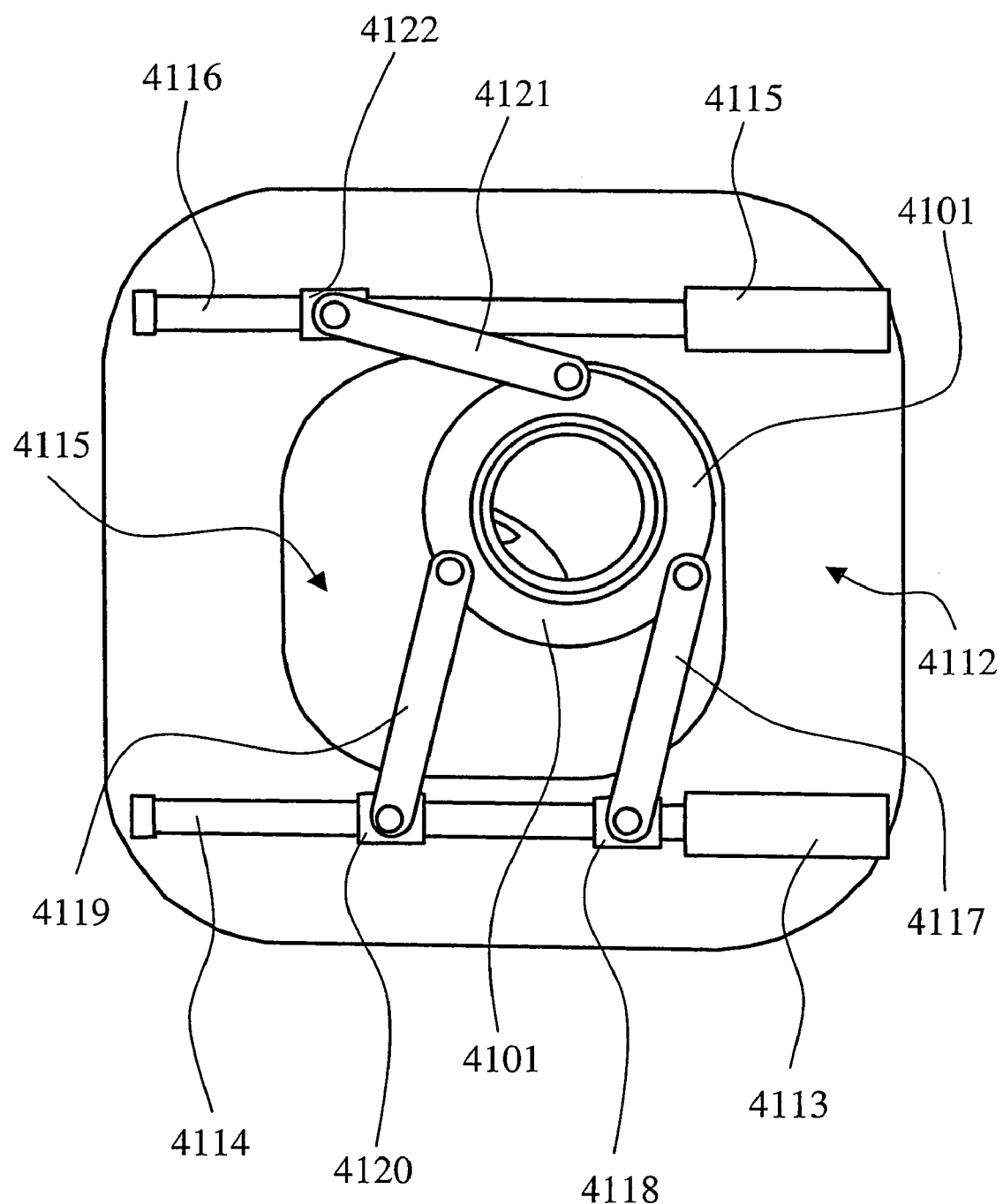
Figure 14:
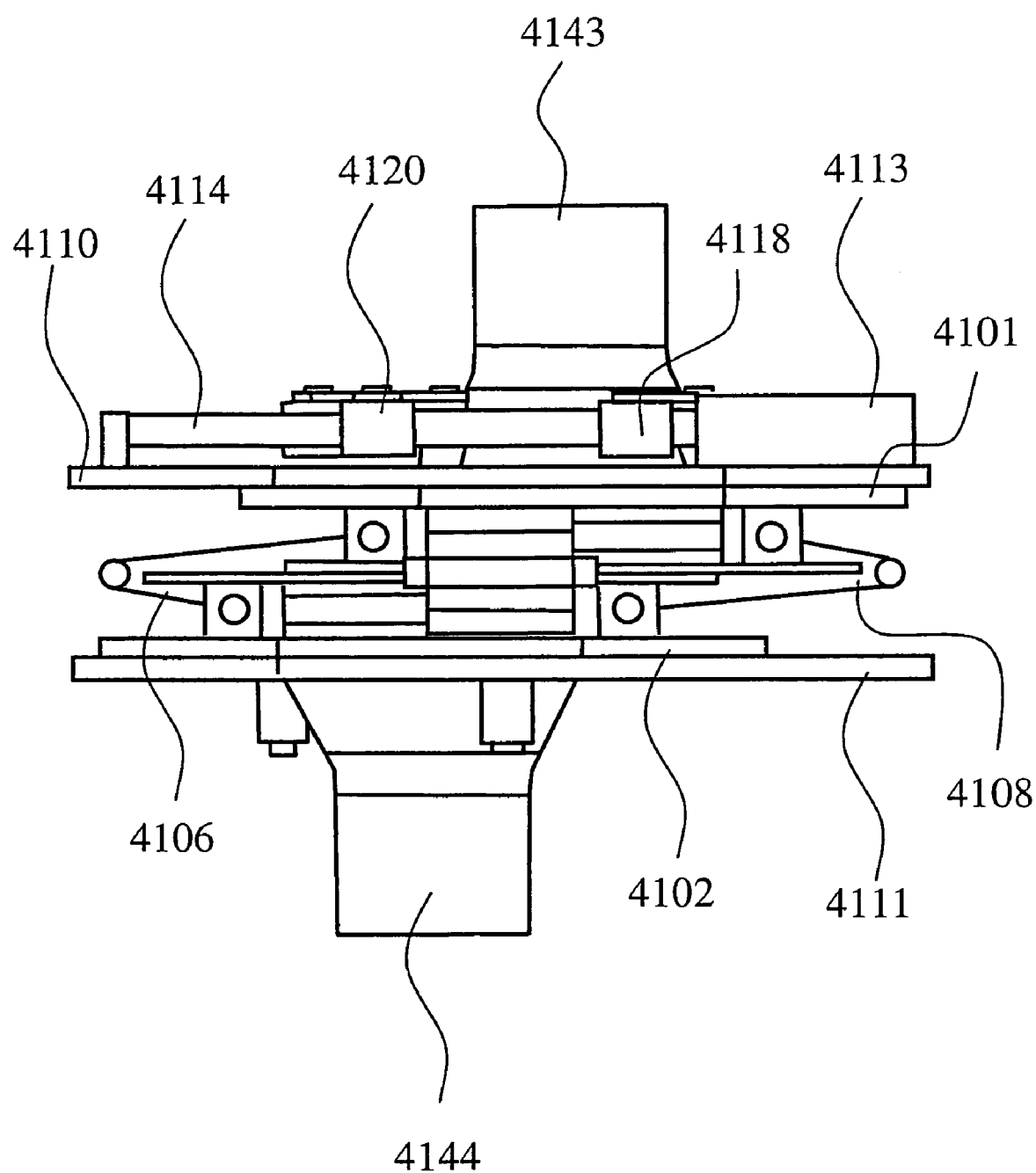
Figure 15:
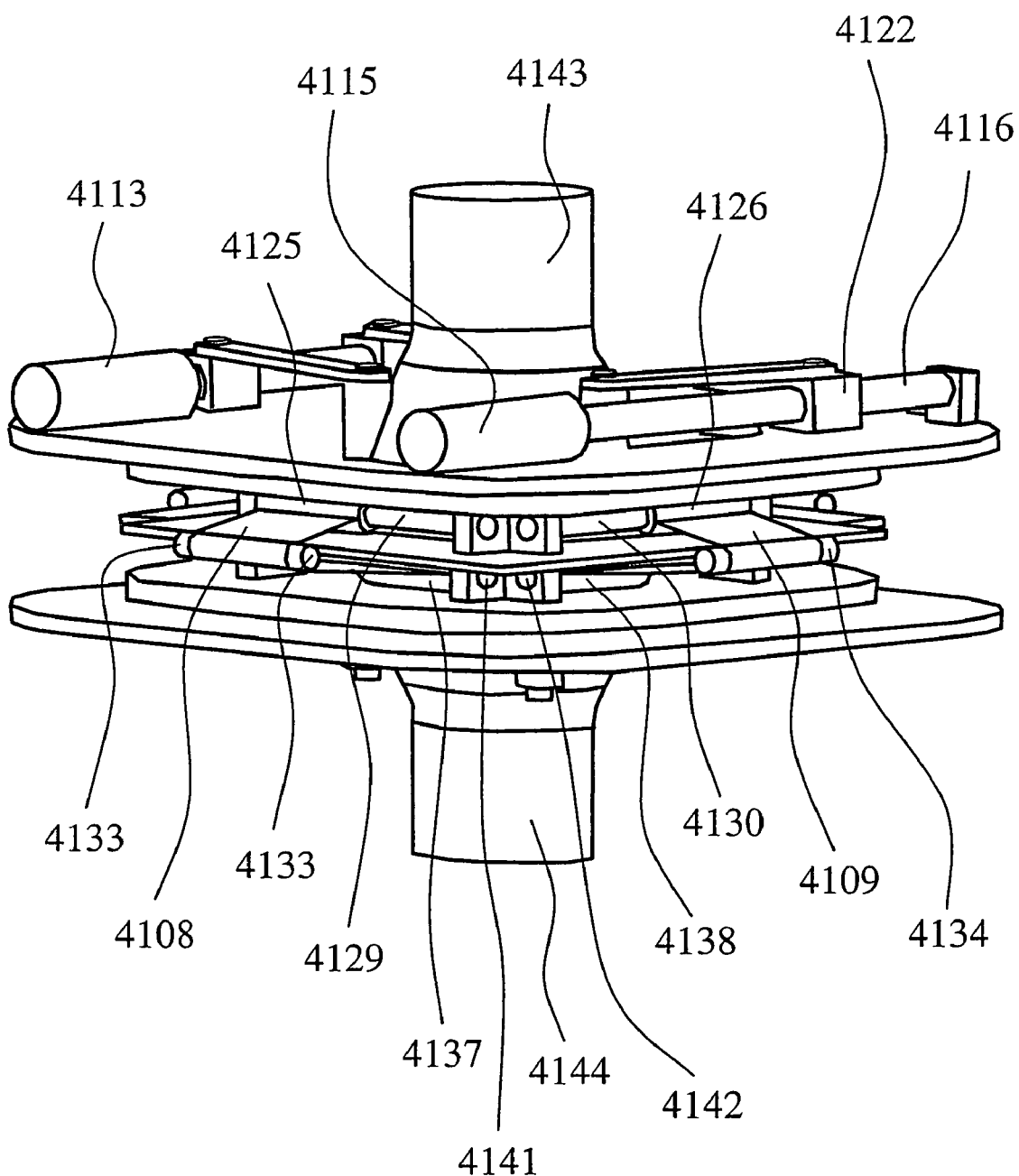
Figure 16:
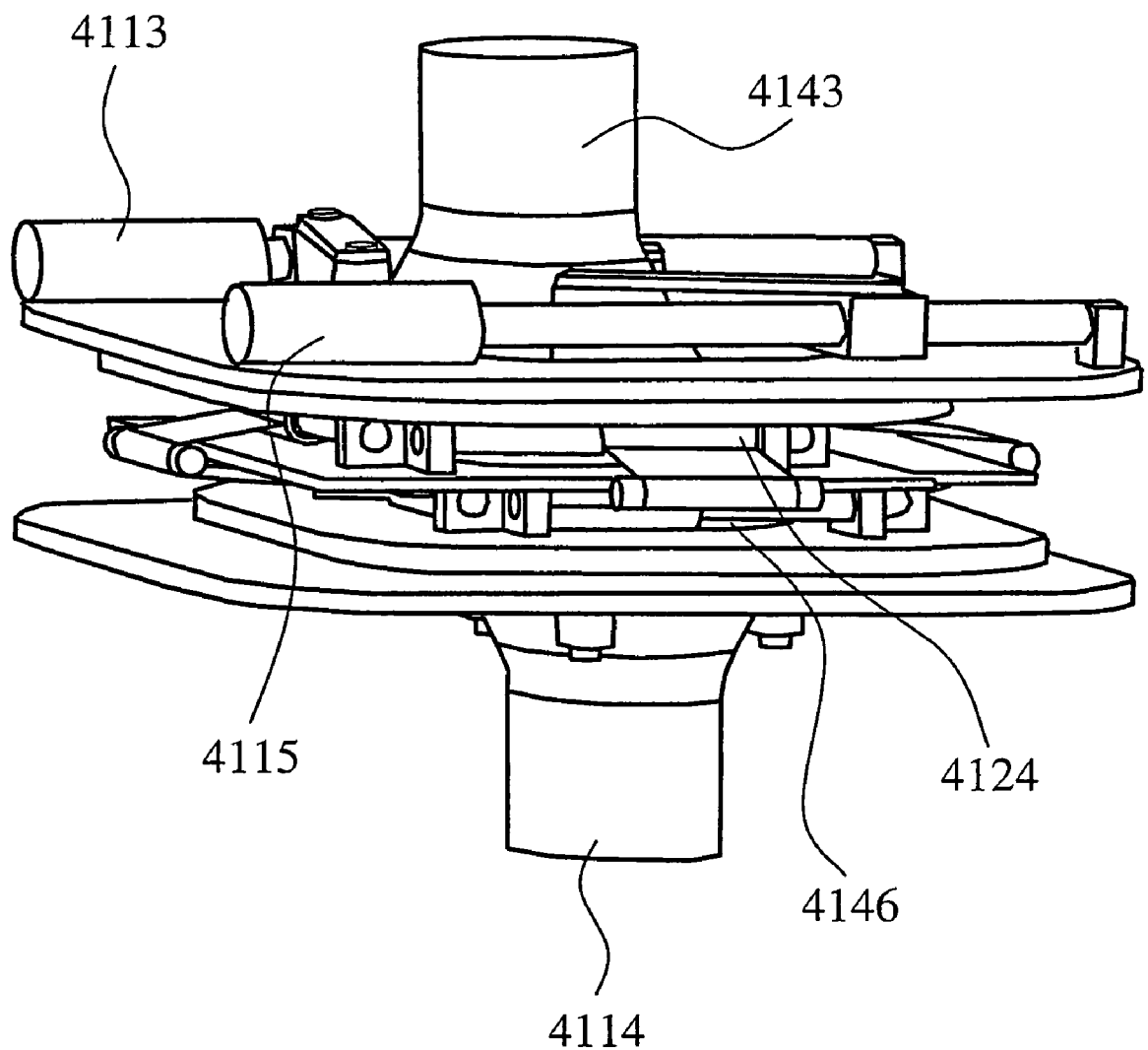
Figure 17:
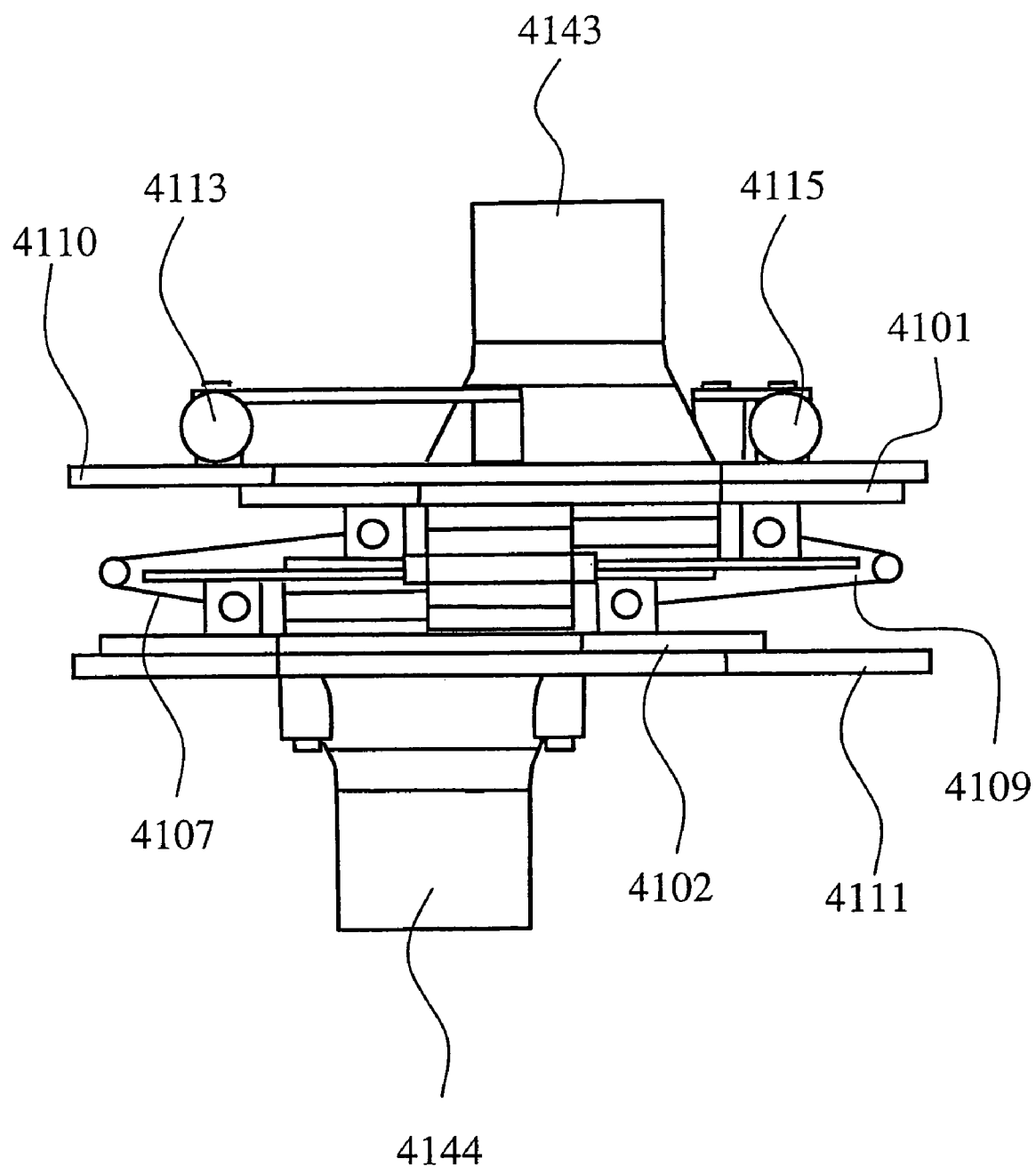

FIGS. 10 and 11 explain the operational principle of a further embodiment 3100 for an adjusting device 3 shown in FIG. 1. The illustrated adjusting device 3100 is shown without a housing in order to make possible a corresponding view of the transmission assemblies in the adjusting device. Insofar as FIGS. 10 and 11 show identical assemblies of the adjusting device, they are identified by the same reference numerals.

A lever transmission 3101 is provided in the adjusting device 3100 of FIG. 10. The adjusting device 3100 includes a base unit 3102 which is coupled by the lever transmission 3101 to a load take-up unit 3103. The lever transmission 3101 has a lever element 3104 which is journalled by means of a ball joint 3105 in a holding part 3106. This lever element 3104 is operatively connected to the base unit 3102 and the load take-up unit 3103. For this purpose, a ball joint 3107 is provided on the base unit 3102. In the same way, a ball joint 3208 is disposed on the load take-up unit 3103.

The holding part 3106 is fixedly connected to a cover part 3108 and a base part 3109 via the housing (not shown in FIGS. 10 and 11). In this way, the holding part 3106 is fixed relative to the cover part 3108 of the adjusting device or to the base part 3109 of the adjusting device. It is understood that also a form of connection of the cover part 3108, holding part 3106 and base part 3109 is possible other than via a housing wall. Accordingly, the fixing of these assemblies by means of connecting rods is also conceivable.

To move the lever element 3104, drives 3110 and 3111 are provided in the adjusting device 3100. These drives include respective electric motors 3112 and 3113 with spindles 3114 and 3115, respectively. The electric motor 3112 is supported on the holding part 3106 for the ball joint 3105. Its spindle 3114 operates on a nut unit 3116 which is guided by a sled 3117 on the load take-up unit 3103.

The electric motor 3113 is supported on the holding part 3106 in the same manner. The motor operates with its spindle 3115 on a nut unit 3118 which is guided with a sled 3119 on the base unit 3102. With the movement of the spindles 3114 or 3115, the load take-up unit 3103 and the base unit 3102 can be moved relative to the holding part 3106 for the ball joint 3105 of the lever element 3104.

A cutout 3122 is provided in the cover part 3108 in order to make possible a movement of a connecting arm 3123, which is connected to the load take-up unit 3103, relative to the base part 3109. In the same way, a cutout 3121 is provided in the cover part 3108 for the movement of a holding arm 3120.

FIGS. 12 to 17 explain the operating principle of a further embodiment 4100 for an adjusting device 3 shown in FIG. 1. The adjusting device 4100 shown is shown without a housing in order make possible a view of the transmission assemblies in the adjusting device. Insofar as identical assemblies are provided in FIGS. 12 to 17, they are identified by the same reference numerals.

The adjusting device 4100 includes a base unit 4101 which is coupled to a load take-up unit 4102 by a transmission 4103. This transmission 4103 makes possible a movement of the load take-up unit 4102 relative to the base unit 4101 in two different directions which are indicated by arrows 4104 and 4105.

Belt elements 4106, 4107, 4108 and 4109 are provided in the transmission 4103 and these belt elements couple a movement of the base unit 4101 to a movement of the load take-up unit 4102. The belt elements 4106 and 4107 form a first belt element pair and the belt elements 4108 and 4109 form a second belt element pair. These two belt element pairs are guided orthogonally to each other.

The belt elements 4106, 4107, 4108 and 4109 are guided by respective slide bushings 4123, 4124, 4125 and 4126 on respective guide shafts 4127, 4128, 4129 and 4130 fixedly connected to the base unit 4101. Respective direction-changing rollers 4131, 4132, 4133 and 4134 are assigned to the belt elements 4106, 4107, 4108 and 4109 which are placed over the respective direction-changing rollers.

The direction-changing rollers 4131, 4132, 4133, 4134 are each accommodated in a support which is fixed relative to the first holding unit 4110. Alternatively, a fixed support relative to the second holding unit 4111 would also be possible.

The belt elements 4106, 4107, 4108, 4109 are connected via slide bushings 4135, 4136, 4137, 4138 to the load take-up unit 4102. These slide bushings 4135, 4136, 4137, 4138 are guided on corresponding guide shafts 4139, 4140, 4141, 4142 which are fixedly connected to the load take-up unit 4102.

The base unit 4101 is, in turn, guided by a slide bearing on a first holding unit 4110. This first holding unit 4110 is configured as a cover part of the housing.

In the same manner, the load take-up unit 4102 is guided on a second holding unit 4111 by a slide bearing. This second holding unit 4111 is configured as a base part of the housing.

A drive 4112 is provided in order to move the load take-up unit 4102 relative to the base unit 4101. This drive includes a first electric motor 4113 having a first spindle drive 4114 and a second electric motor 4115 having a second spindle drive 4116. The first spindle drive 4114 and the second spindle drive 4116 are journalled on the first holding unit 4110.

The drive 4112 further includes a first guide element 4117 which is hinged to a first nut 4118 and to the base unit 4101. The first nut 4118 is guided on the first spindle drive 4114. Furthermore, the drive includes a second guide element 4119 which is hinged to a second nut 4120 and to the base unit 4101. The second nut 4120 is guided on the spindle drive 4114. The first guide element and the second guide element 4119 could, however, also be guided on a single nut on the spindle drive 4114. A third guide element 4121 is provided as a part of the drive 4112 and this guide element is attached so as to be rotationally moveable on a third nut 4122 to the base unit 4101. The third nut 4122 is guided on the second spindle drive 4116.

The first guide element 4117 and the second guide element 4119 are parallel to each other.

A first holding arm 4143 is configured on the base unit 4101 and a connecting arm 4144 is configured on the load take-up unit 4102.

The first holding unit 4110 includes a recess 4145 for the first holding arm 4143. Correspondingly, the second holding unit 4111 has a recess 4146 for the connecting arm 4144.

When the base unit 4101 is moved by drive 4112, then this movement is transferred in the opposite direction to the load take-up unit 4102 which can be moved in the plane indicated by the arrows 4104 and 4105.

Figure 18:
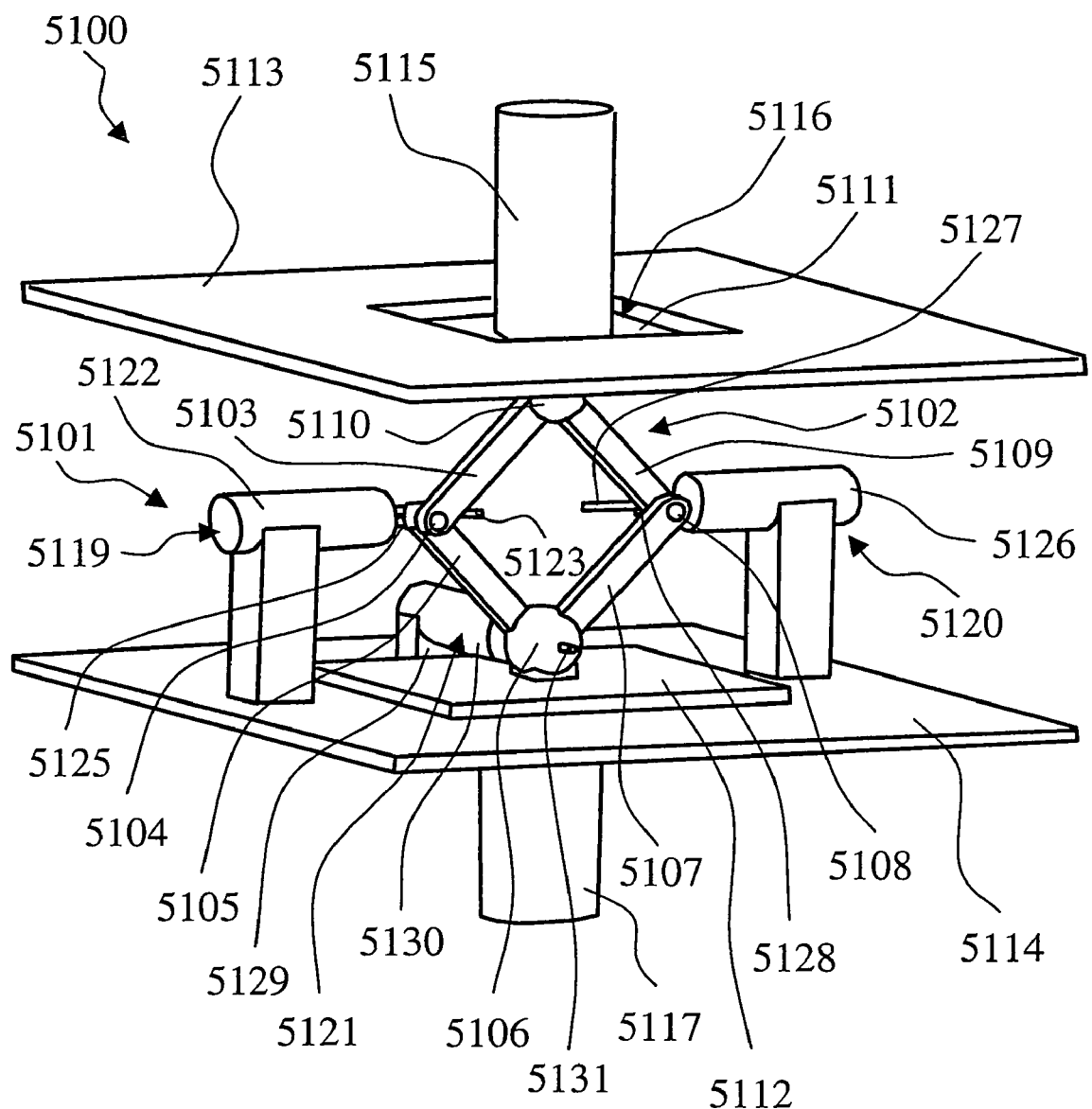
FIGS. 18 and 19 show perspective views of still another embodiment for the adjusting device of FIG. 1 with the housing removed.
Figure 19:
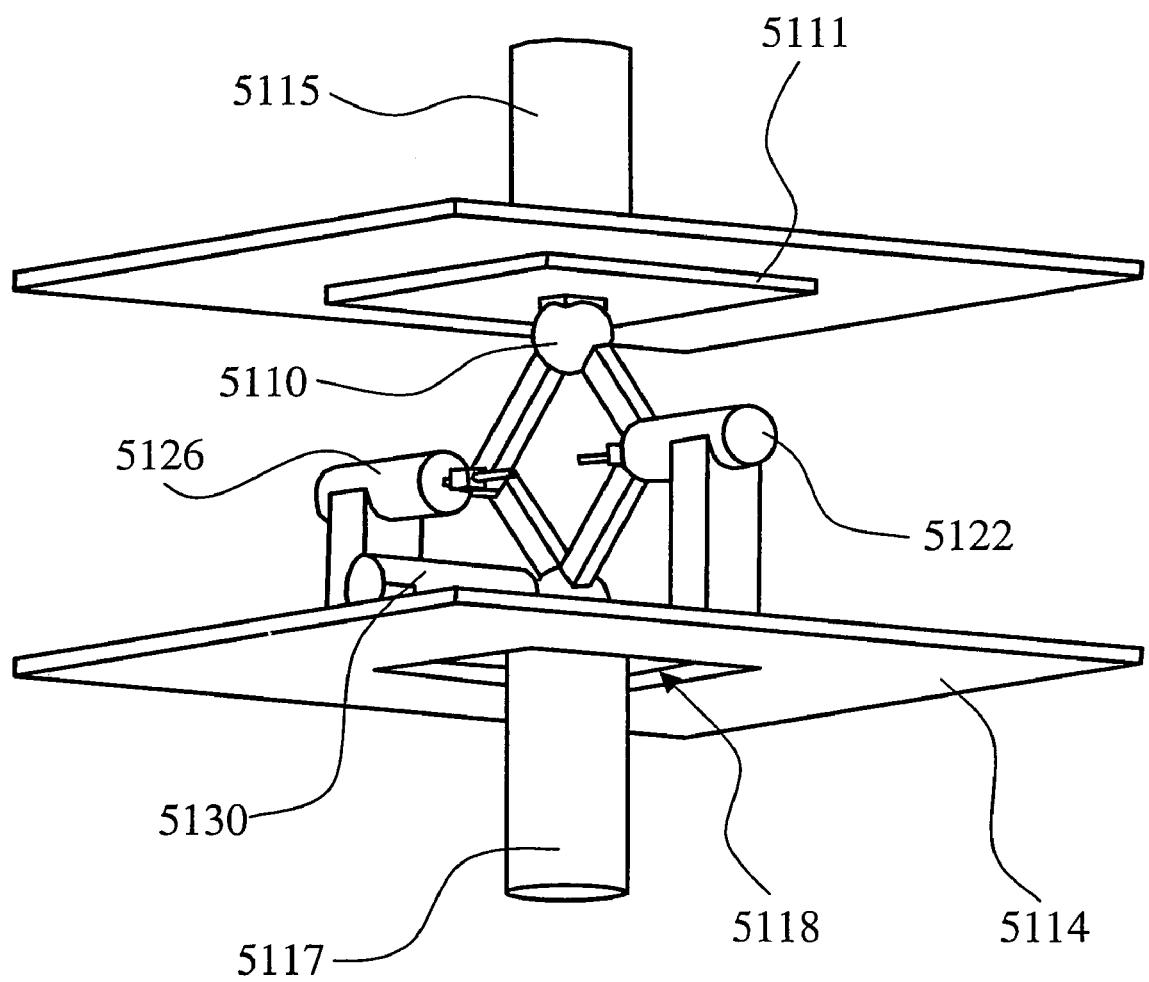

FIGS. 18 and 19 explain the operation of a further embodiment 5100 for an adjusting device 3 shown in FIG. 1. The adjusting device 5100 is shown without a housing in order to make possible a view of the transmission assemblies in the adjusting device.

In the adjusting device of FIG. 18, a rhombic transmission 5101 is provided with a linkage arm parallelogram 5102. This linkage arm parallelogram has a first guide element 5103 which is connected to a second guide element 5105 via a first rotational joint 5104. This second guide element 5105 is connected to a third guide element 5107 via a ball joint 5106. A fourth guide element 5109 is hinged to this third guide element 5107 by a rotational joint 5108. This fourth guide element 5109 is connected to the first guide element 5103 via a ball joint 5110.

The linkage arm parallelogram 5102 is, in turn, connected via the ball joint 5110 to a base unit 5111 and is connected via the ball joint 5106 to a load take-up unit 5112.

The base unit is guided on a cover part 5113 by a slide bearing (not shown). In a corresponding manner, the load take-up unit lies with a slide bearing on a base part 5114.

A holding arm 5115 is mounted on the base part 5114. This holding arm 5115 projects through a cutout 5116 in the cover part 5113. A connecting arm 5117 is disposed on the load take-up unit 5112. In correspondence to the holding arm 5115, this connecting arm 5117 projects through a cutout 5118 in the base part 5114.

The cover part 5113 and the base part 5114 are rigidly connected to each other via the housing (not shown).

Drives 5119, 5120 and 5121 are provided for moving the adjusting device. The drive 5119 includes an electric motor 5122 which drives a spindle 5123. This spindle 5123 operates on a nut 5125 which is arranged on the first rotational joint 5104. The drive 5120 has an electric motor 5126 with which a spindle 5127 is moved. The spindle 5127 operates on a nut 5128 on the rotational joint 5108.

The drive 5121 is accommodated on the base part 5114 with a slide guide 5129 and is there displaceable in a direction parallel to the spindles 5123 and 5127. An electric motor 5130 is assigned to the drive 5121 and drives a spindle 5131 which acts on a thread in the ball joint 5106.

The drives 5119, 5120 and 5121 are supported on the base part 5114 of the adjusting device 5100. The connecting arm 5117 can be moved relative to the holding arm 5115 by means of drives 5119 and 5120 in the direction of spindles 5123 and 5127 of the electric motors 5122 and 5126. In the same way, the drive 5121 makes possible a relative movement of connecting arm 5117 and holding arm 5115 perpendicular to this direction of movement.

Correspondingly, the connecting arm 5117 can be moved relative to the holding arm 5115 in a direction parallel to the spindles 5123 and 5127 by means of the drives 5119 and 5120. The drive 5121 ensures a relative movement of the connecting arm 5117 and the holding arm 5115 perpendicular to this direction in that the linkage arm parallelogram 5102 is tilted. The stretching of the linkage arm parallelogram 5102, which is required for such a movement, is ensured via the drives 5119 and 5120.

Figure 20:
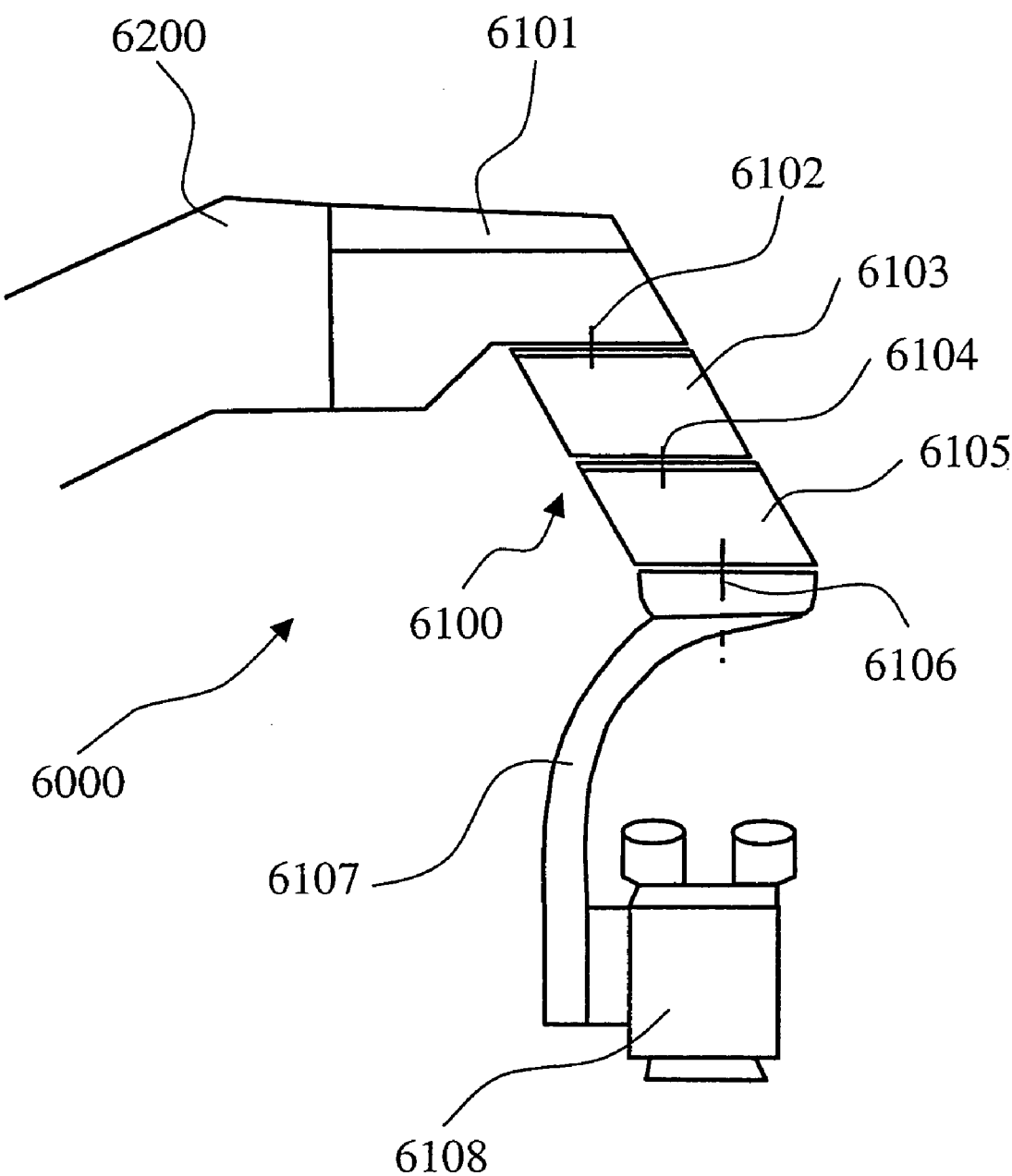
FIG. 20 is a portion of a stand with a sixth alternative embodiment for an adjusting device showing a surgical microscope accommodated thereon.

FIG. 20 shows a section of a stand 6000 having a further alternate embodiment for an adjusting device 6100 of the invention on which a surgical microscope is accommodated. The stand 6000 has a carrier arm 6200 with a base unit 6101. A first rotational member 6103 is hinged to this base unit 6101 by a first rotational shaft 6102. This first rotational member 6103 carries a second rotational member 6105 which is rotationally moveable about a second rotational axis 6104. A load take-up unit 6107 with surgical microscope 6108 is mounted with a third rotational shaft 6106 on the second rotational member 6105.

In the adjusting device 6100, the first rotational shaft 6102 and the second rotational axis 6104 are offset with respect to each other. Likewise, the second rotational axis 6104 and the third rotational shaft 6106 are offset with respect to each other.

The first rotational member 6103 and the second rotational member 6105 are configured as oblique cylinders which, preferably, have an elliptical cross-sectional area. This form of the rotational members makes it possible that, even for a rotated adjusting device, no sharp edges occur which constitute a danger of injury. Furthermore, such surfaces can be easily cleaned and sterilized. Basically, the rotational members can also be configured as cylinders or in any other geometrical form.

Figure 21:
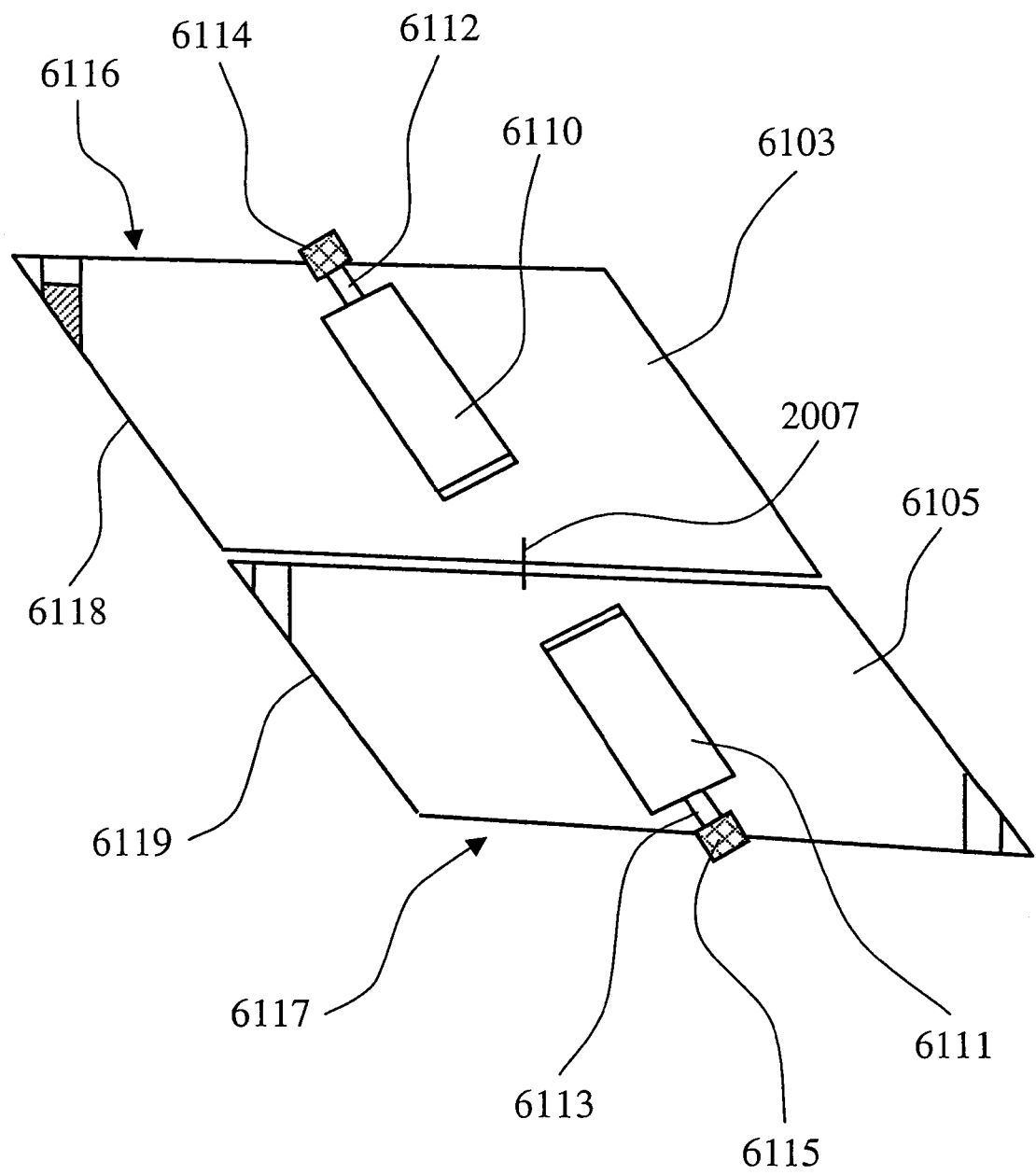
FIG. 21 is a section view of the component assemblies of the embodiment of FIG. 20.

FIG. 21 shows a schematic section view of the rotational members 6103 and 6105 of FIG. 20 with the drives provided therein which are in the form of electric motors 6110 and 6111. The electric motors 6110 and 6111 move drive shafts 6112 and 6113 to which respective drive pinions 6114 and 6115 are assigned. These drive pinions 6114 and 6115 mesh with respective crown gears (not shown). The drive shaft 6112 is at an angle to a connecting surface 6116 of the first rotational member 6103 to the base unit 6101 of FIG. 20. In a corresponding manner, the drive shaft 6113 is at an angle to the connecting surface 6117 of the second rotational member 6105. Preferably, the orientation of the drive shafts 6112 and 6113 is parallel to the outer surfaces 6118 and 6119 of the first rotational member 6103 and of the second rotational member 6105.

Figure 22:
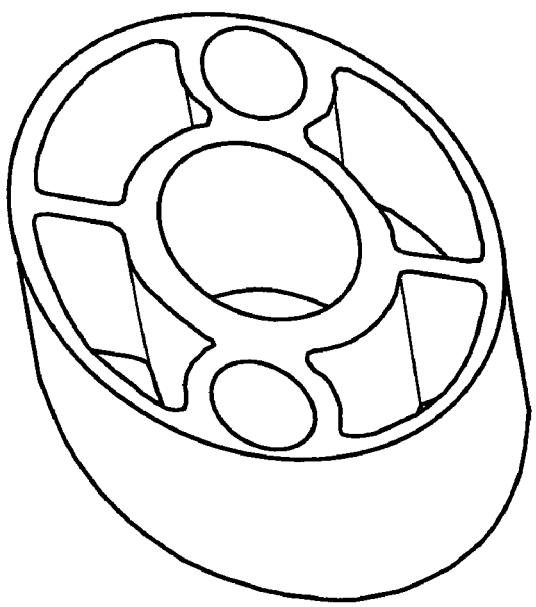
FIGS. 22 to 24 show a honeycomb-shaped profile structure for the component assemblies shown in FIGS. 20 and 21.
Figure 23:
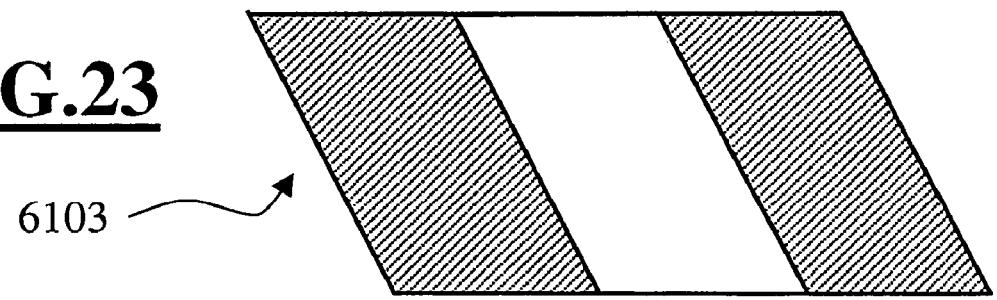
Figure 24:
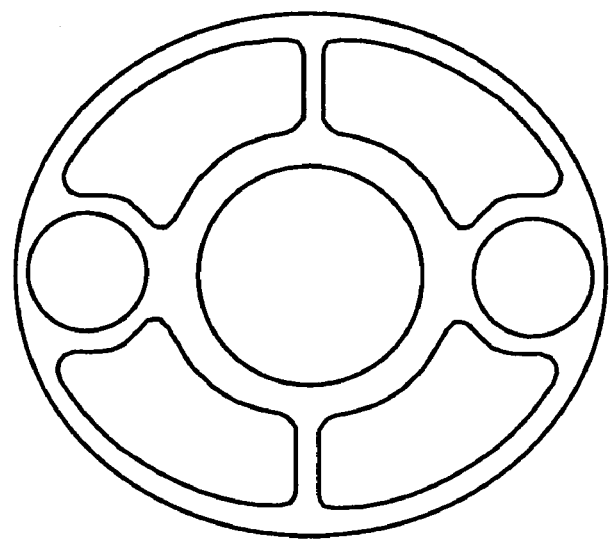

In order to ensure an especially high stability of the rotational members 6103 and 6105 of FIGS. 20 and 21, these rotational members have honeycomb-shaped profile structures shown in FIGS. 22 to 24. This honeycomb-shaped profile structure makes possible especially an easy passthrough of cables through a correspondingly equipped stand for surgical microscopes.

Figure 25:
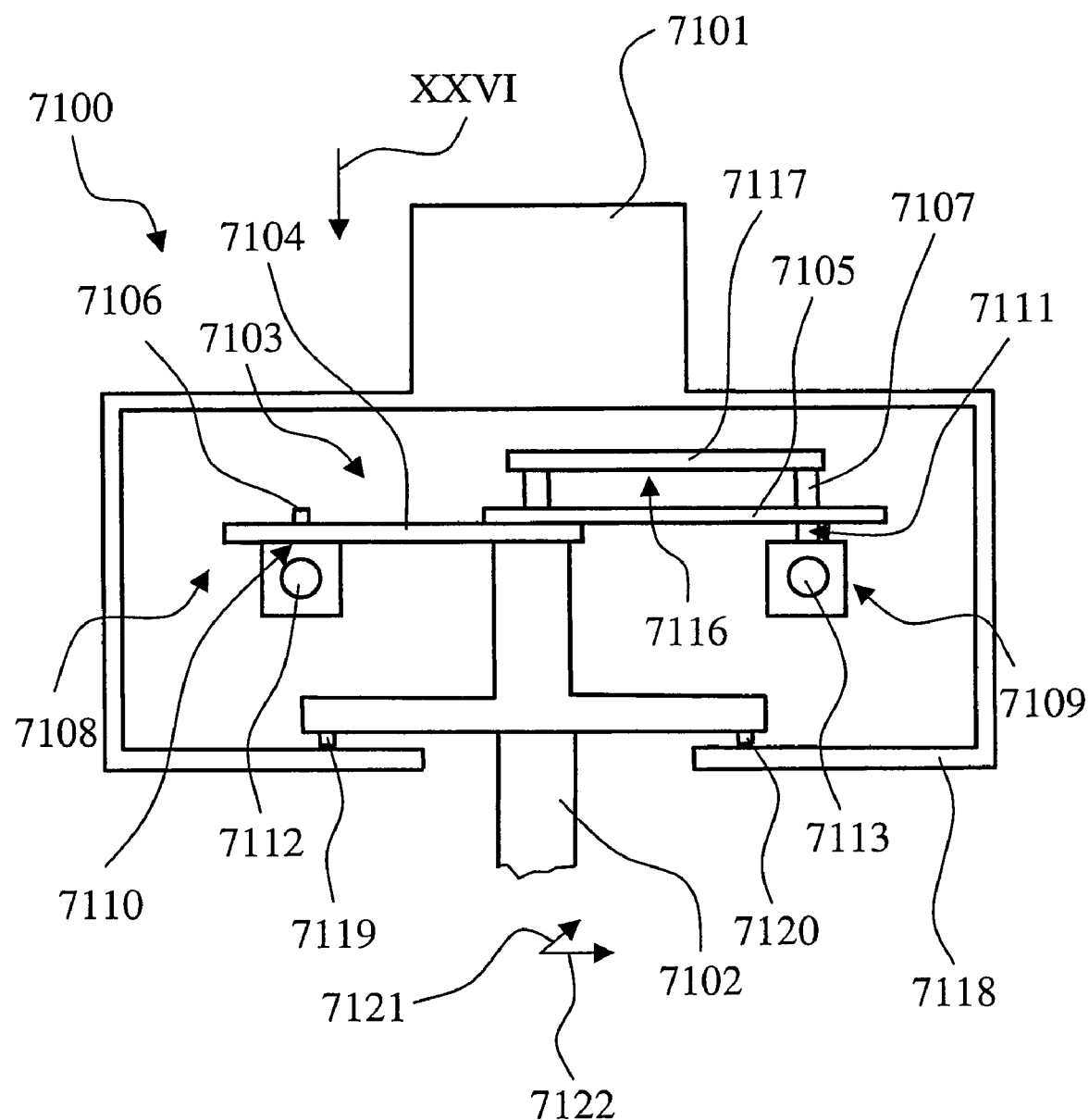
FIG. 25 is a schematic showing a seventh embodiment for an adjusting device of FIG. 1.

FIG. 25 shows another embodiment for an adjusting device 3 of FIG. 1. The adjusting device 7100 has a base unit 7101 which can be connected to the holding arm 7 of stand 1 of FIG. 1. Furthermore, with the adjusting device 7100, a load take-up unit 7102 is provided which is coupled to the base unit 7101 by a transmission 7103. This transmission 7103 makes possible a movement of the load take-up unit 7102 relative to the base unit 7101 in two different directions.

The transmission 7103 has a first linkage arm 7104 and a second linkage arm 7105. These linkage arms 7104 and 7105 are rotationally moveably connected to the load take-up unit 7102. The linkage arm 7104 is hinged by a rotational joint 7106 to a first displacing unit 7108. The linkage arm 7105 is correspondingly attached by a rotational joint 7107 to a second displacing unit 7109.

The load take-up unit 7102 is itself guided on bearings 7119 and 7120 in a housing 7118 which is fixedly connected to the base unit 7101. This housing 7118 surrounds the transmission 7103 of the adjusting device.

Figure 26:
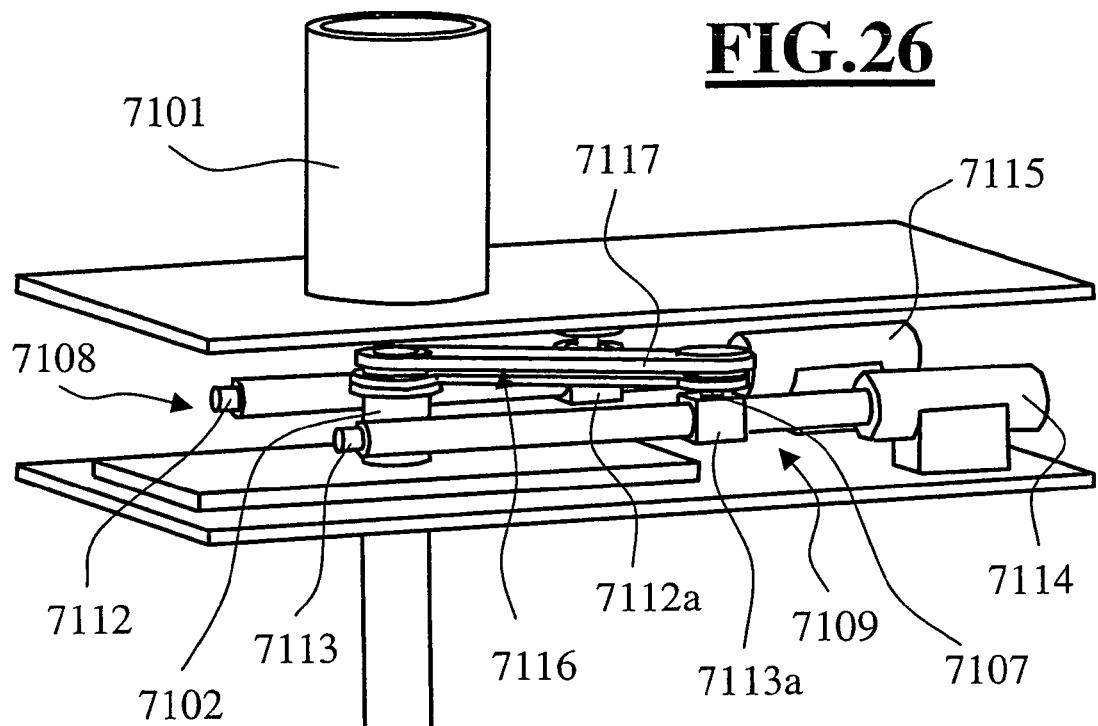
FIGS. 26 and 27 are perspective views of the adjusting device of FIG. 25.
Figure 27:
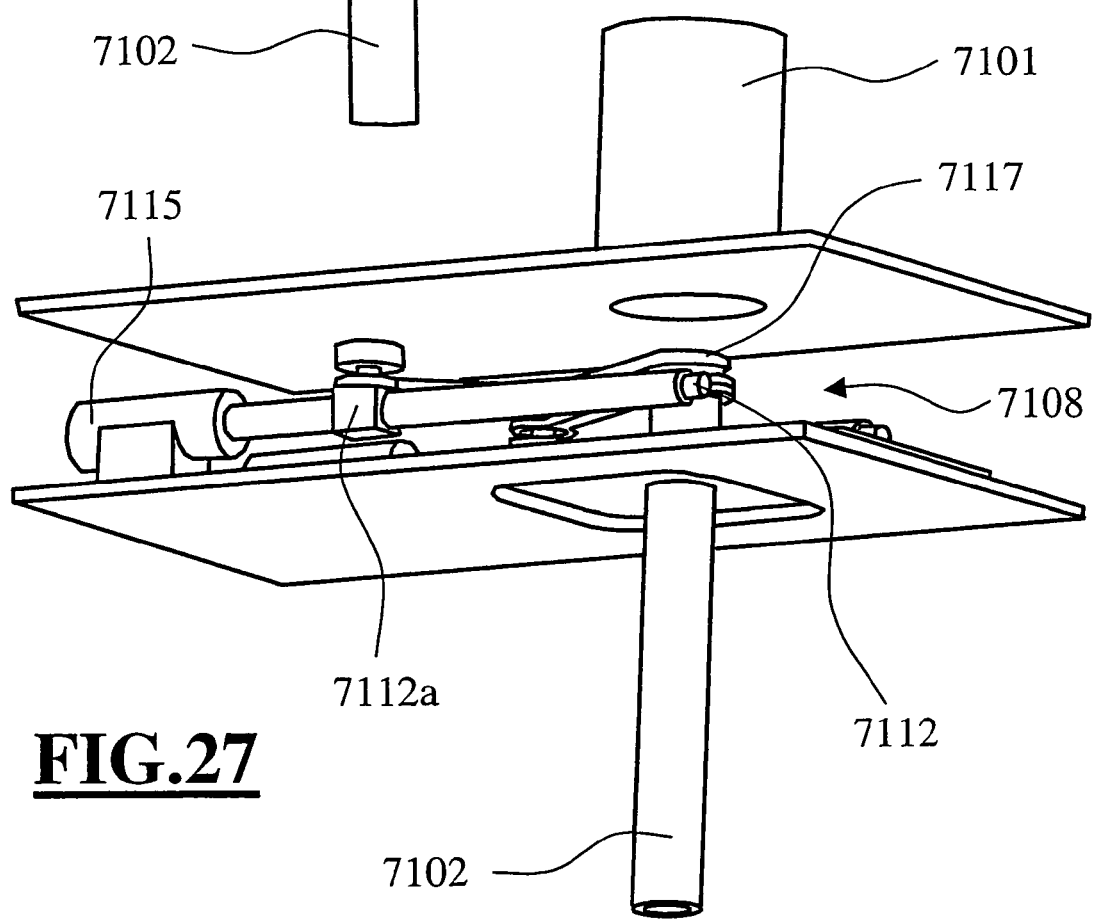

In FIGS. 26 and 27, perspective views of the adjusting device of FIG. 25 are presented without showing the housing section surrounding the displacing unit 7109 in order to explain the function thereof. Insofar as the above-mentioned FIGS. show the same assemblies, they are identified by identical reference numerals.

The displacing units 7108 and 7109 include respective electric motors (7114, 7115) which drive respective drive spindles (7112, 7113). Displacing nuts (7112a, 7113a) are guided on these drive spindles. The linkage arm 7104 of FIG. 25 is hinged to the nut 7112a and is attached at a further linkage point to the load take-up unit 7102.

In the same way, the linkage arm 7105 is hinged to the load take-up unit 7102 and to the displacing nut 7113a. The linkage arm 7105 likewise acts on the load take-up unit 7102 of FIG. 25. With a movement of the displacing nuts 7112a and 7113a, hinge points 7110 and 7111 of the linkage arms 7104 and 7105 are displaced on the drive spindles 7112 and 7113 and thereby are shifted relative to the base unit 7101. A displacing movement of the displacing nuts 7112a and 7113a thereby acts on the load take-up unit 7102 which can be moved as shown with arrows 7121 and 7122 in a plane perpendicular to the plane of the drawing.

In order to compensate a rotational movement of the load take-up unit 7102 with such a shift, a coupling mechanism 7116 is assigned to the linkage arm 7105 and this coupling mechanism transmits a rotational movement of the rotational joint 7107 at the displacement unit to the load take-up unit 7102. This coupling mechanism 7116 has a toothed belt 7117 which is guided about corresponding toothed belt guides on the rotational joint 7107 and on the load take-up unit 7102. It is understood that the coupling mechanism 7116 can be basically configured also as a toothed wheel transmission.

Figure 28:
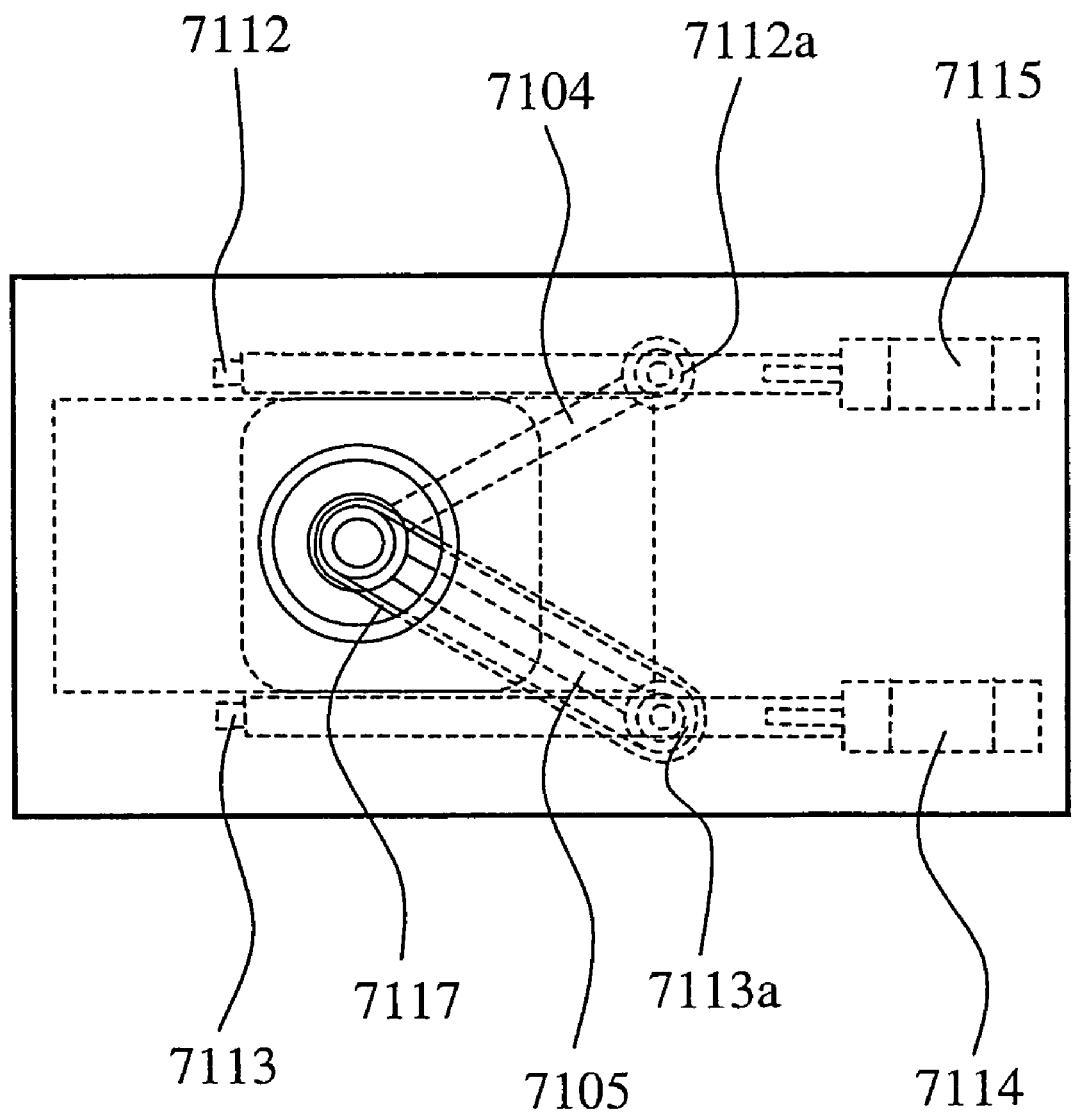
FIG. 28 is a detail schematic of the adjusting device of FIG. 25.

FIG. 28 is a partial view of the adjusting device 7100 of FIG. 25 viewed in the direction indicated by arrow XXVI.

Figure 29:
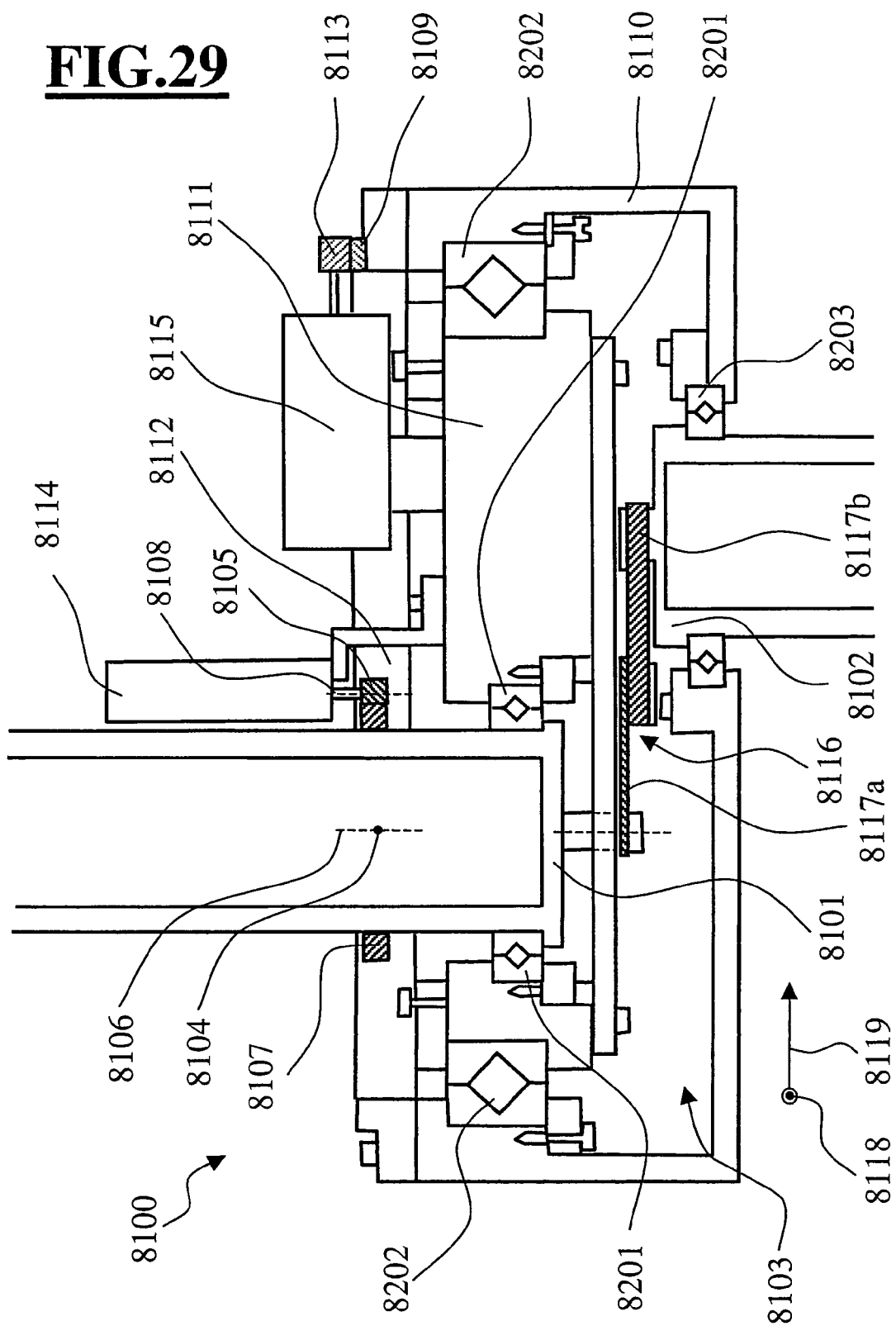
FIG. 29 is a schematic of an eighth embodiment of the adjusting device of the invention.

A further embodiment for an adjusting device for use in a stand 1 for a surgical microscope 2 of FIG. 1 is shown in FIG. 29. The adjusting device 8100 has a base unit 8101 which, in turn, is coupled to a load take-up unit 8102 via a transmission 8103. This transmission makes a movement of the load take-up unit 8102 possible relative to the base unit 8101 in two different directions.

The transmission 8103 is configured as an eccentric arrangement and has a first rotational center 8104 and a second rotational center 8105. The second rotational center 8105 is offset to the first rotational center 8104.

With the transmission, the load take-up unit 8102 can be moved relative to the base unit 8101 about the first rotational center 8104 as well as about the second rotational center 8105. For this purpose, the first rotational center 8104 is defined by the axis 8106 of a first rotational bearing 8201. The axis 8106 of the rotational bearing 8201 corresponds to the axis of a first crown gear 8107. This crown gear 8107 is fixedly connected to the base unit 8101. The second rotational center 8105 is the center of the axis 8108 of a second rotational bearing 8202. The axis 8108 corresponds to the axis of a second crown gear 8109. This second crown gear 8109 is fixedly connected with means 8110 for holding the load take-up unit 8102.

The transmission 8103 further has a transmission intermediate member 8111 on which a first gear wheel 8112 is journalled. This first gear wheel 8112 meshes with the first crown gear 8107. In addition, a second gear wheel 8113 is journalled on the transmission intermediate member 8111 and this gear wheel 8113 meshes with the second crown gear 8109.

Electric motors (8114, 8115) are provided for driving the first gear wheel 8112 and for driving the second gear wheel 8113, respectively.

The load take-up unit 8102 is rotatably journalled in a bearing 8203 on the means 8110 for holding the load take-up unit.

In the transmission 8103, a coupling transmission 8116 is provided that transmits a rotation of the transmission intermediate member 8111 about the first rotational center 8104 and about the second rotational center 8105 to the load take-up unit 8102. For this purpose, a toothed belt 8117a and a toothed belt 8117b are provided in the transmission 8116 and these toothed belts are placed over corresponding toothed belt guides.

The axes 8106 and 8108 of the first rotational center 8104 and of the second rotational center 8105 are parallel to each other.

By driving the gear wheel 8112 with the electric motor 8114, the load take-up unit 8102 can be moved along a circular path about the axis 8106 of the first rotational center 8104.

When the gear wheel 8113 is driven by the electric motor 8115, then the load take-up unit 8102 moves about the axis 8108 of the second rotation center 8105. The axes (8106, 8108) of the rotational centers (8104, 8105), respectively, are arranged offset to each other. For this reason, it is possible to move the load take-up unit 8102 in the plane indicated by arrows 8118 and 8119 by correspondingly controlling the electric motors 8114 and 8115. For a movement of the load take-up unit 8102, it is ensured via the coupling transmission 8116 that the load take-up unit 8102 maintains its orientation, that is, the unit 8102 is overall not rotated relative to a fixed point.

Figure 30:
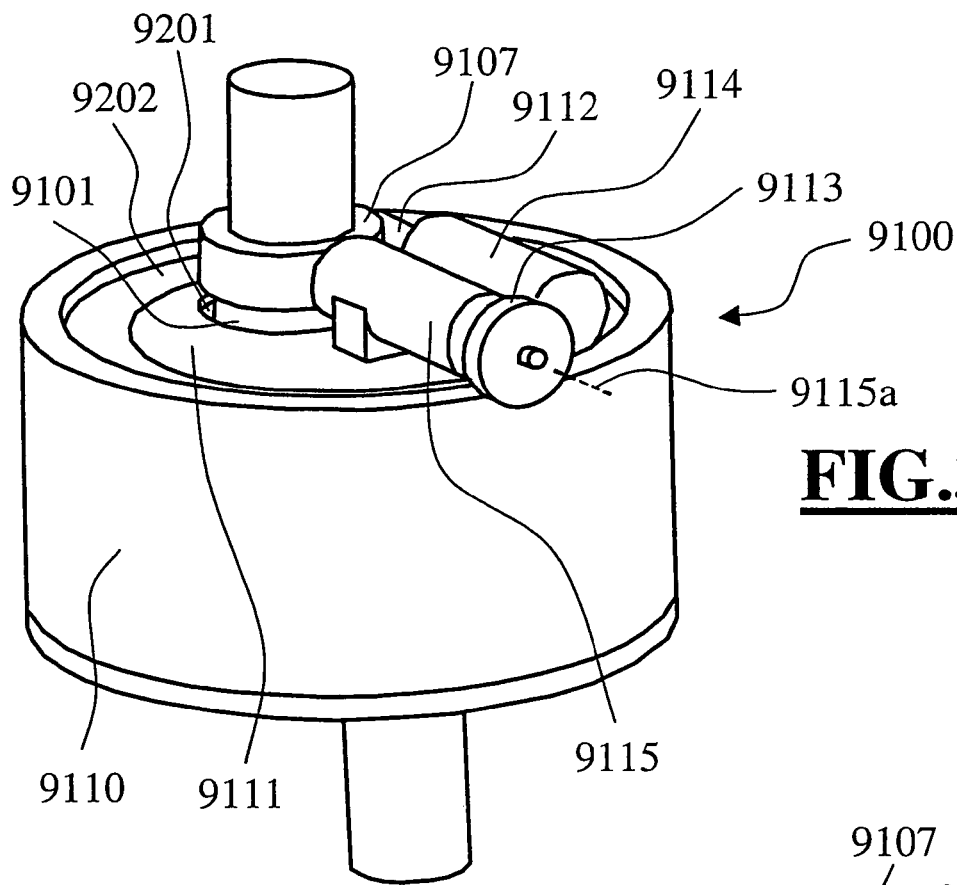
FIG. 30 is a perspective view of a ninth embodiment of the adjusting device of the invention.
Figure 31:
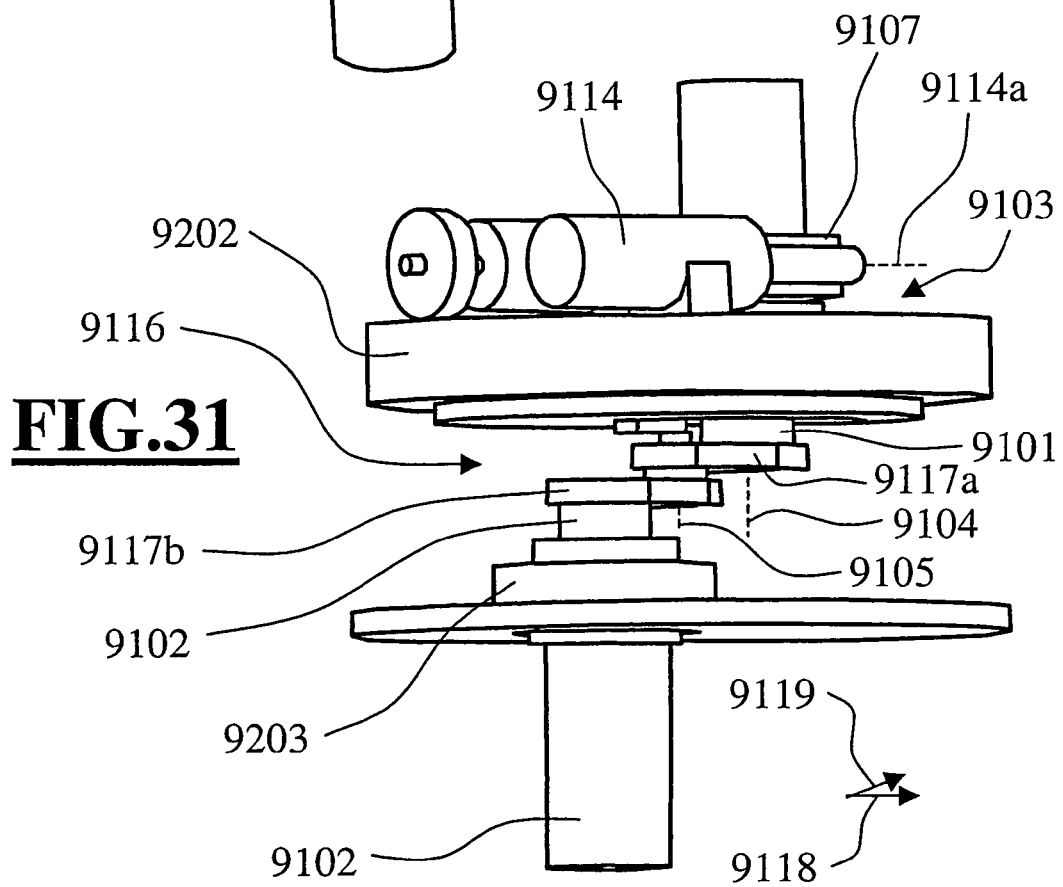
FIG. 31 is a partial view of the ninth embodiment of the adjusting device.
Figure 32:
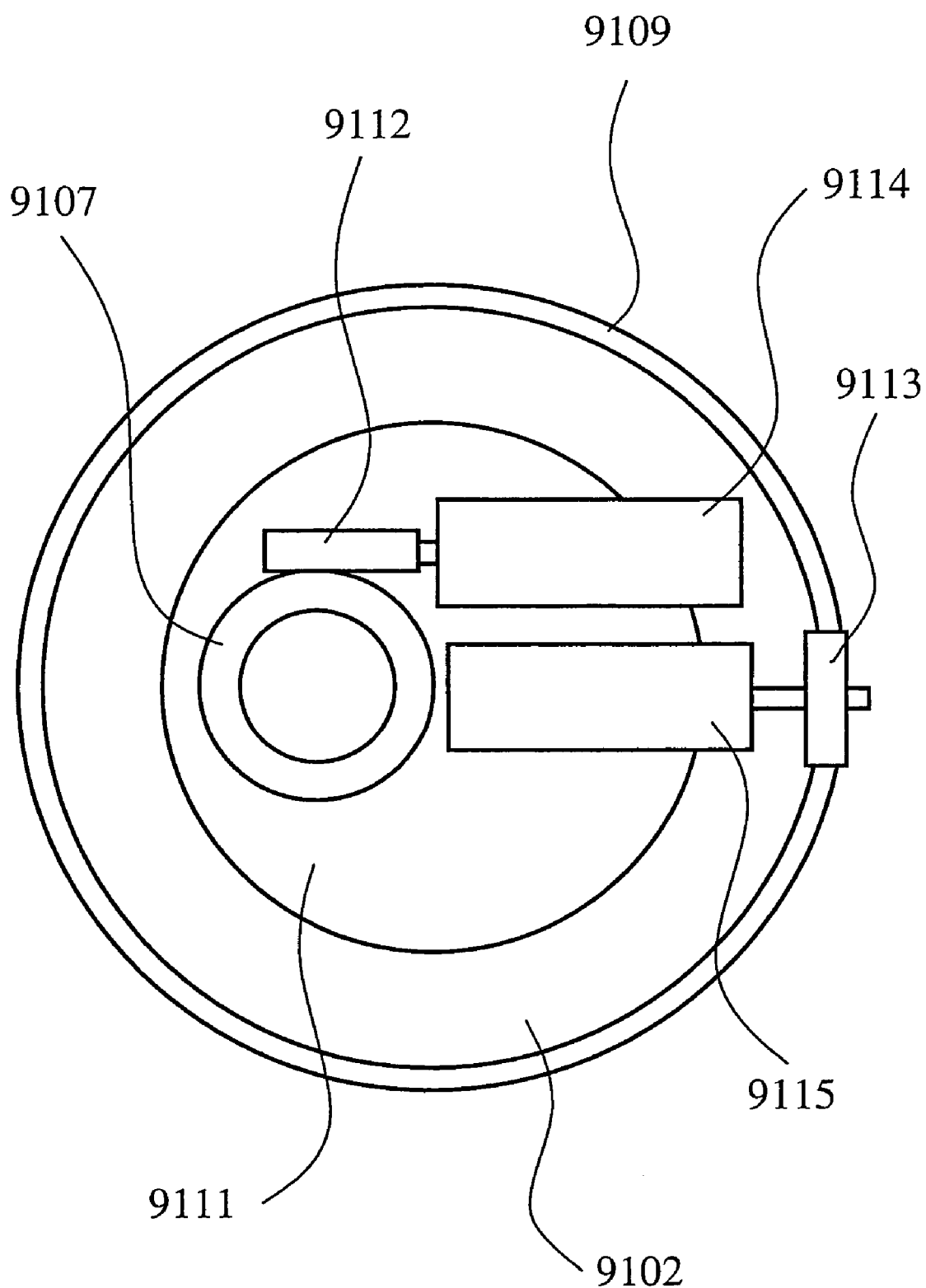
FIG. 32 is a side elevation view of the ninth embodiment of the adjusting device.

An adjusting device, which is slightly modified with respect to the embodiment for an adjusting device of FIG. 29 is explained with respect to FIGS. 30 to 32. The adjusting device 9100 has a base unit 9101 which, in turn, is coupled to a load take-up unit 9102 via a transmission 9103. This transmission makes possible a movement of the load take-up unit 9102 relative to the base unit 9101 in two different directions.

The transmission 9103 has a first rotational axis 9104 and a second rotational axis 9105. The second rotational axis 9105 is offset to the first rotational axis 9104.

With the transmission, the load take-up unit 9102 can be moved relative to the base unit 9101 about the first rotational axis 9104 as well as about the second rotational axis 9105. For this purpose, the first rotational axis 9104 is defined by the shaft of a first rotational bearing 9201. This axis corresponds to the axis of a worm gear wheel 9107. The worm gear wheel 9107 is fixedly connected to the base unit 9101. The second rotational axis 9105 corresponds to the shaft of a second rotational bearing 9202. This axis is the rotational center of a crown gear 9109. The crown gear 9109 is fixedly connected to means 9110, which partially surround the transmission, for holding the load take-up unit 9102.

The transmission 9103 further has a transmission intermediate member 9111 having a worm gear 9112. This worm gear 9112 meshes with the worm gear wheel 9107. One such worm gear transmission makes possible a self restraint of the system against displacement. Furthermore, a gear wheel 9113 is journalled on the transmission intermediate member 9111 and this gear wheel meshes with a crown gear 9109.

Electric motors 9114 and 9115 are provided for driving the worm gear 9112 and the gear wheel 9113, respectively. The rotational axes 9114a and 9115a of the electric motors 9114 and 9115 are aligned parallel to each other. Basically, the rotational axes of the electric motors could, however, also be at an angle to each other. In bearing 9203, the load take-up unit 9102 is rotatably journalled on means 9110 for holding the load take-up unit 9102.

Furthermore, a coupling transmission 9116 is provided in the transmission 9103 and this coupling transmission transmits a rotation of the transmission intermediate member 9111 about the first rotational axis 9104 and about the second rotational axis 9105 to the load take-up unit 9102. For this purpose, a toothed belt 9117a and a toothed belt 9117b are provided in the transmission 9116 and these belts are placed about corresponding toothed belt guides.

The rotational axes 9104 and 9105 are parallel to each other.

The load take-up unit 9102 can be moved along a circular path about the rotational axis 9104 by driving the gear wheel 9113 with the electric motor 9114.

The load take-up unit 9102 moves about the rotational axis 9105 when the gear wheel 9113 is driven by the electric motor 9115. The rotational axes (9104, 9105) are arranged offset to each other. For this reason, it is possible, with a corresponding control of the electric motors 9114 and 9115, to move the load take-up unit 9102 in the plane indicated by arrows 9118 and 9119. With a movement of the load take-up unit 9102, it is ensured that, via the coupling transmission 9116, the load take-up unit 9102 maintains its orientation, that is, it is overall not rotated relative to a spatially fixed point.

Figure 33:
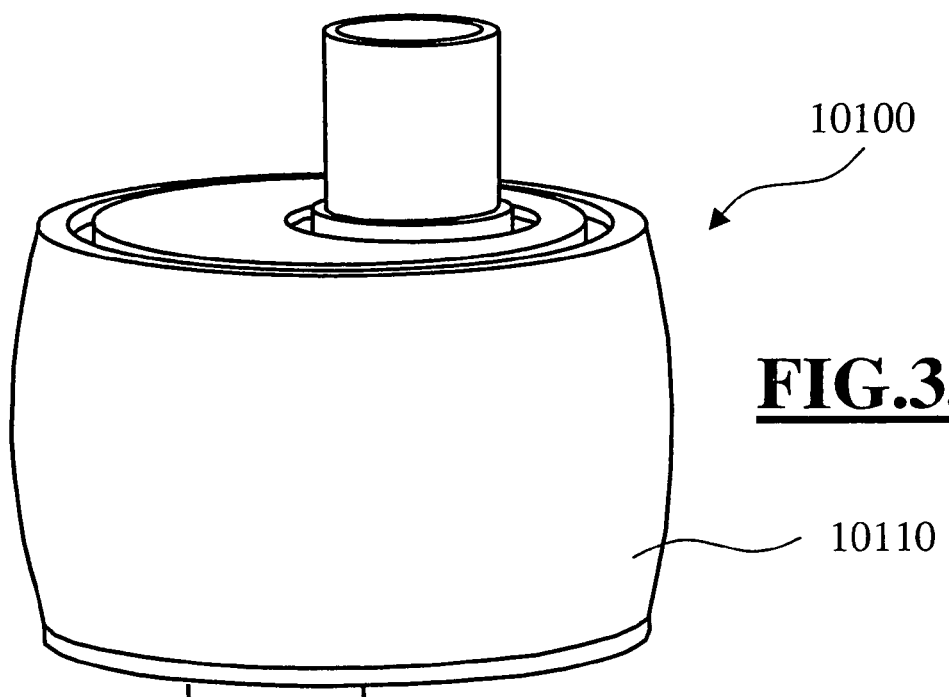
FIG. 33 is a perspective view of a tenth embodiment of the adjusting device.
Figure 34:
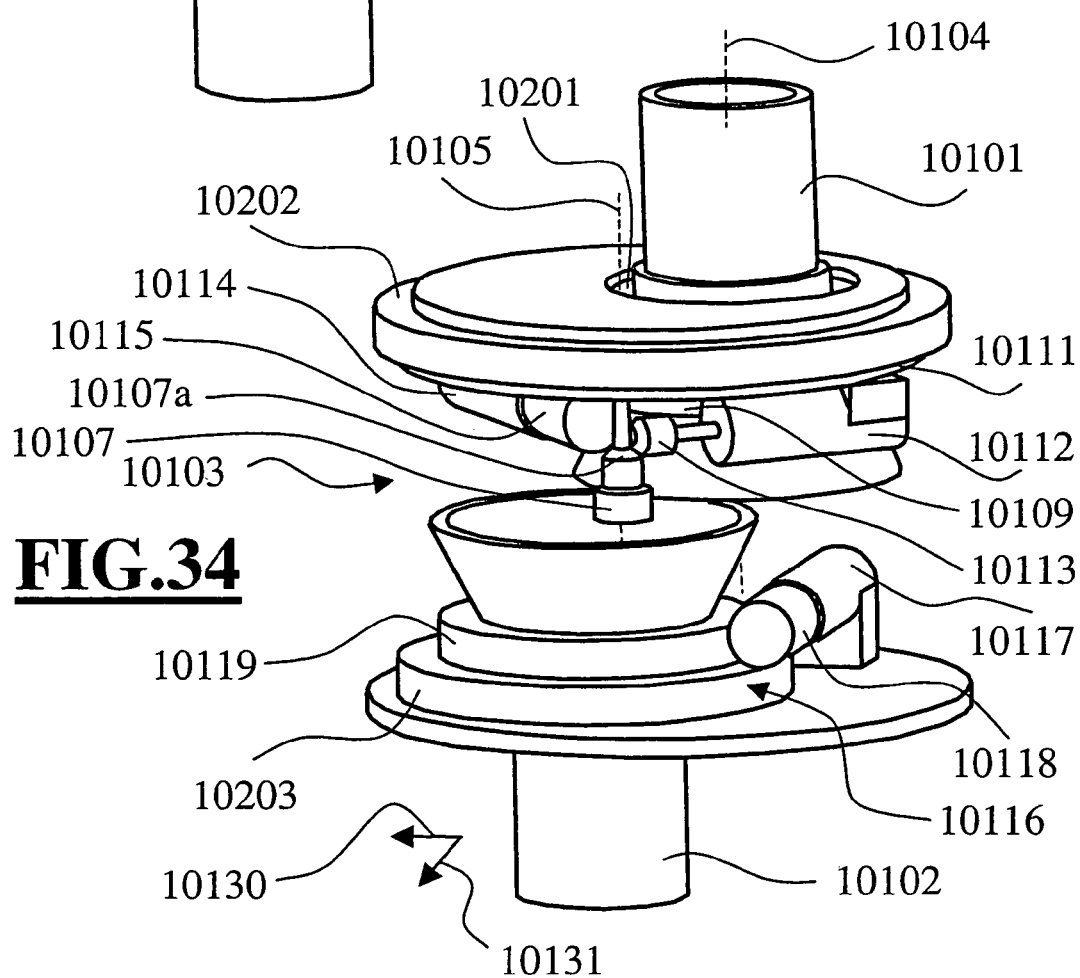
FIG. 34 is a partial view of the tenth embodiment shown in FIG. 33.

A further embodiment of an adjusting device for use in a stand 1 for a surgical microscope 2 of FIG. 1 is described in the following with respect to FIGS. 33 to 35. The adjusting device 10100 has a base unit 10101 which, in turn, is coupled to a load take-up unit 10102 via a transmission 10103. This transmission makes possible a movement of the load take-up unit 10102 relative to the base unit 10101 in two different directions.

In correspondence to the adjusting devices explained with respect to FIGS. 29 to 32, the transmission 10103 has a first rotational axis 10104 and a second rotational axis 10105. The second rotational axis 10105 is arranged offset to the first rotational axis 10104.

With the transmission, the load take-up unit 10102 can be moved relative to the base unit 10101 about the first rotational axis 10104 as well as about the second rotational axis 10105. For this purpose, the rotational axis 10105 is defined by the shaft of a crown gear (not shown) which is mounted on the inner periphery of a housing which functions as means 10110 for holding the load take-up unit. A gear wheel 10107 meshes in this crown gear and the gear wheel is driven via a gear wheel by an electric motor 10112 with gear wheel 10113. The gear wheel is configured as a bevel gear 10107a. The above housing is rotatably journalled in a bearing 10202. The rotational axis 10104 is the axis of a worm gear wheel 10109. The worm gear wheel 10109 is fixedly connected to the base unit 10101. The housing is held in a bearing 10201 and functions as means 10110 for holding the load take-up unit on the base unit 10101.

The transmission 10103 further has a second electric motor 10114 which moves a worm gear 10115 which acts on the worm gear wheel 10109.

The load take-up unit 10102 is rotatably journalled with a bearing 10203 on the means 10110 for holding the load take-up unit 10102.

The load take-up unit 10102 can be moved along a circular path about the rotational axis 10105 by driving the gear wheel 10107 with the electric motor 10112.

When the worm gear 10115 is driven by the electric motor 10114, then the load take-up unit 10102 is moved about the rotational axis 10104. The rotational axes (10104, 10105) are offset with respect to each other. For this reason, it is possible, via a corresponding control of the electric motors and 10112, to move the load take-up unit 10102 in the plane indicated by the arrows 10130 and 10131.

In the adjusting device 10100, a transmission 10116 is provided which transmits a rotation of the transmission intermediate member 10111 about the first rotational axis 10104 and about the second rotational axis 10105 to the load take-up unit 10102.

However, instead of providing a belt drive as in the embodiments explained with respect to FIGS. 29 to 32 (which belt drive compensates an unwanted change of the orientation of the load take-up unit 10102 relative to the base unit 10101 when there is a movement of the adjusting device), in this embodiment there is an electric motor 10117, which drives a worm gear 10118, which meshes with a worm gear wheel 10119 fixedly connected to the load take-up unit 10102.

The worm gear drive, which is provided in the adjusting device 10100, effects, because of self restraint, that the adjusting device cannot be moved from the outside or only with difficulty via the action of force.

A control unit (not shown) having a control program is assigned to the electric motor 10117 which ensures that, for a movement of the load take-up unit 10102 relative to the base unit 10101, this unit maintains its orientation, that is, it is overall not rotated relative to a spatially fixed point.

The base unit 10101 is configured as a hollow body which projects into the transmission 10103 with a funnel-shaped closure element 10120.

In a corresponding manner, the load take-up unit 10102 is configured as a hollow body having a funnel-shaped closure element 10121.

Figure 35:
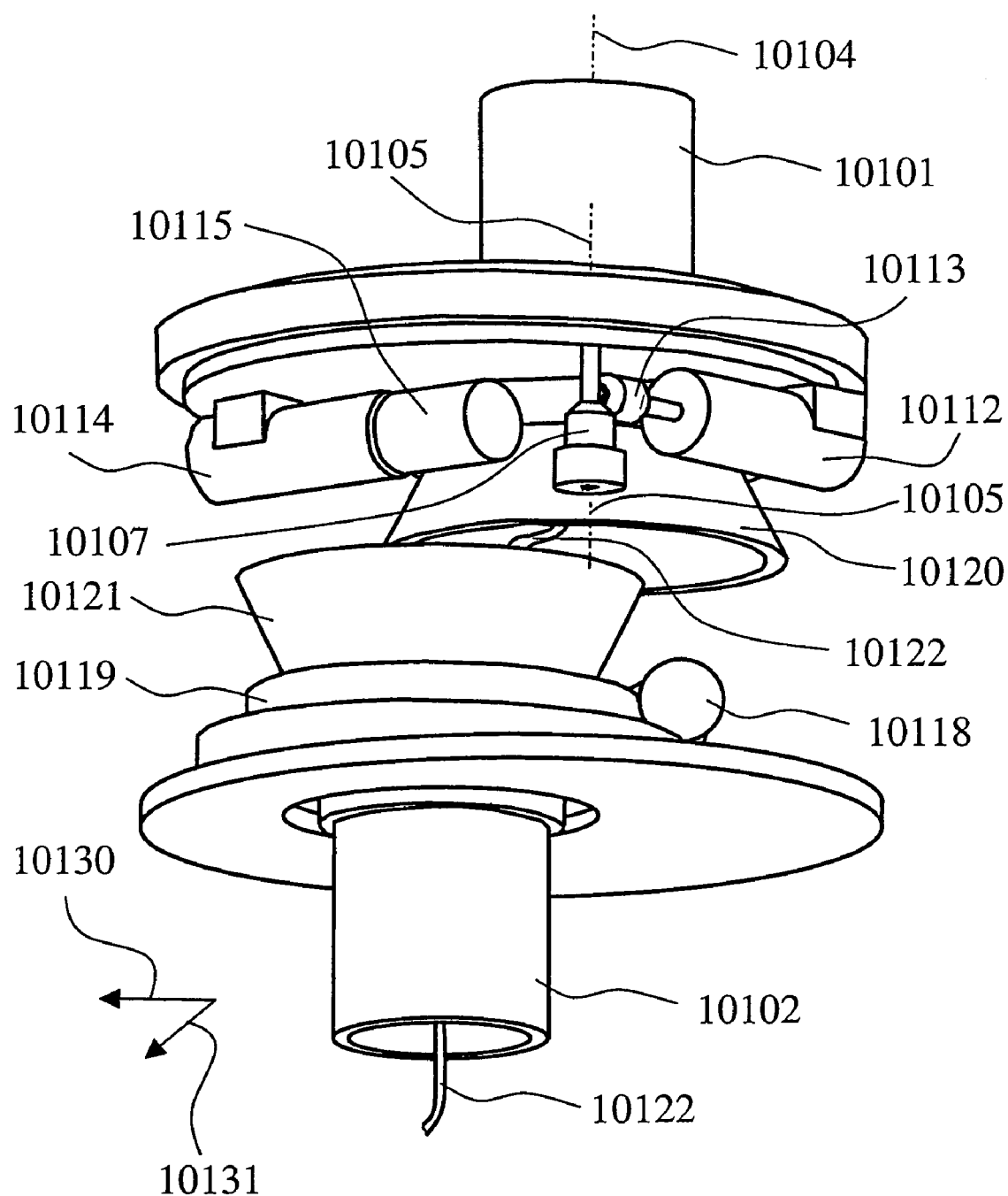
FIG. 35 is a further partial view of the tenth embodiment shown in FIG. 33.

As shown in FIG. 35, the funnel-shaped closure elements 10120 and 10121 make possible a good guidance of cables and supply harnesses 10122 through the adjusting device 10100 so that a kinking and breaking of the guided supply harnesses can be avoided.

It is noted that the adjusting devices described are not only suitable for the movement of medical-optical equipment accommodated on a stand; rather, they can also be used in machine tools for the adjustment and displacement of a machine table.

It is understood that the foregoing description is that of the preferred embodiments of the invention and that various changes and modifications may be made thereto without departing from the spirit and scope of the invention as defined in the appended claims.

What is claimed is:

1. An adjusting device comprising:
   a base unit;
   a load take-up unit;
   a transmission coupling said units to each other so as to permit a movement of said load take-up unit relative to said base unit in two different directions; and,
   said transmission including:
   a coupling plate connected to said base unit; and,
   two force-transmitting units interposed between said coupling plate and said load take-up unit so as to permit at least one of said force-transmitting units to roll off on said coupling plate in response to a movement of said load take-up unit relative to said base unit.

2. The adjusting device of claim 1, wherein said force-transmitting units are configured as track units or belt units which roll off on said coupling plate.

3. The adjusting device of claim 1, wherein said force-transmitting units each include two wheel elements journalled on rotational axes.

4. The adjusting device of claim 3, wherein the rotational axes of said wheel elements are mutually orthogonal.

5. The adjusting device of claim 3, wherein said wheel elements are configured as respective gear wheels.

6. The adjusting device of claim 1, wherein said coupling plate is a first coupling plate and said adjusting device further comprises a second coupling plate connected to said load take-up unit and engaging said force-transmitting units so as to permit said movement between said units.

7. The adjusting device of claim 1, wherein said coupling plate is configured as a toothed plate.

8. The adjusting device of claim 1, wherein said transmission includes a drive assigned to said force-transmitting units.

9. The adjusting device of claim 8, wherein said drive is configured as an electric drive.

10. The adjusting device of claim 1, wherein said coupling plate has a cutout formed therein for passing cables therethrough.

11. The adjusting device of claim 1, wherein said coupling plate is fixedly attached to said base unit.

12. The adjusting device of claim 1, wherein said force-transmitting units are journalled in a support unit fixedly connected to said base unit.

13. The adjusting device of claim 6, wherein one of said coupling plates is fixedly connected to said load take-up unit.

14. A stand comprising:
   a carrier arm for taking up a load;
   an adjusting device connected to said carrier arm;
   said adjusting device including:
   a base unit;
   a load take-up unit;
   a transmission coupling said units to each other so as to permit a movement of said load take-up unit relative to said base unit in two different directions; and,
   said transmission including:
   a coupling plate connected to said base unit; and,
   two force-transmitting units interposed between said coupling plate and said load take-up unit so as to permit at least one of said force-transmitting units to roll off on said coupling plate in response to a movement of said load take-up unit relative to said base unit.

* * * * *